United States Patent [19]
Morimoto

[11] Patent Number: 5,340,966
[45] Date of Patent: Aug. 23, 1994

[54] AUTOMATIC FACSIMILE-RECEIVING-SHEET RECOGNIZING APPARATUS

[75] Inventor: Kazuo Morimoto, Yokohama, Japan

[73] Assignee: Matsushita Electric Industrial Co., Ltd., Osaka, Japan

[21] Appl. No.: 778,489

[22] Filed: Oct. 17, 1991

[30] Foreign Application Priority Data

| Oct. 23, 1990 | [JP] | Japan | 2-285316 |
| Oct. 23, 1990 | [JP] | Japan | 2-285317 |
| Oct. 23, 1990 | [JP] | Japan | 2-285318 |
| Oct. 23, 1990 | [JP] | Japan | 2-285319 |

[51] Int. Cl.$^5$ ............ G06F 15/46; G06K 15/00; G06K 19/06; G06K 7/10
[52] U.S. Cl. .................. 235/376; 235/383; 235/385; 235/470; 235/494; 358/408
[58] Field of Search ........ 235/470, 462, 494, 381, 235/376, 383, 385; 358/408; 283/67

[56] References Cited

U.S. PATENT DOCUMENTS

| 4,937,439 | 6/1990 | Wanninger et al. | 235/494 |
| 4,999,481 | 3/1991 | Baer et al. | 236/494 |
| 5,013,897 | 5/1991 | Harman et al. | 235/381 |
| 5,028,770 | 7/1991 | Miyazaki et al. | 235/462 |
| 5,051,779 | 9/1991 | Hikawa | 235/494 |
| 5,059,775 | 10/1991 | Nakayama | 235/494 |
| 5,095,195 | 3/1992 | Harman et al. | 235/381 |
| 5,128,527 | 7/1992 | Kawai et al. | 235/494 |
| 5,178,417 | 1/1993 | Eshoo | 283/67 |
| 5,250,789 | 10/1993 | Johnsen | 235/383 |
| 5,262,623 | 11/1993 | Batterman et al. | 235/494 |

Primary Examiner—Timothy P. Callahan
Assistant Examiner—Trong Phan
Attorney, Agent, or Firm—Stevens, Davis, Miller & Mosher

[57] ABSTRACT

An automatic facsimile-receiving-sheet recognizing apparatus including: a device for automatically receiving facsimile information transmitted from an orderer; a device for detecting the position of a bar code, a mark sheet and a figure in a received sheet and automatically cutting their images; and a device for automatically recognizing the cut bar code, the mark sheet and the figure and transmitting the result of the recognition to a store controller of an automatic order receiving and sales control system.

2 Claims, 21 Drawing Sheets

DELIVERY REQUEST ORDER SHEET

CUSTOMER'S ADDRESS ●○◇◆□■△▲ CUSTOMER NO. = 35402484249

△▲▽▼✳︎☆★○●○◇◆

CUSTOMER'S NAME ○△▽■▲

TELEPHONE NO. 06-123-4567

ENTER DESTINATION, ADDRESS, NAME TELEPHONE NO. IN THE FOLLOWING FIELD

ADDRESS

NAME
TELEPHONE NO.

SELECT REQUESTED DELIVER DATE BY MARKING METHOD AND ENTER MONTH AND DATE IN THE RIGHT FIELDS.

1 2 3 4 5 6 7 8 9 10 11 12

| 1 | 2 | 3 | 4 | 5 | 6 | 7 | 8 | 9 | 10 | 11 | 12 |

ENTER MONTH

| 1 | 2 | 3 | | | x10 | | | | O | | |

ENTER DATE

| 1 | 2 | 3 | 4 | 5 | 6 | 7 | 8 | 9 | 0 | | x1 |

COMMODITY ORDER LABEL APPLICATION FIELD

CHECK EITHER FIGURE BELOW BY SMEARING IT WITH PENCIL TO DISTINGUISH FINAL PAGE OR ADDITIONAL PAGE PRESENT

FINAL PAGE ① ADDITIONAL PAGE PRESENT ②

FIG. 4

300 COMMODITY ORDER LABEL

COMMODITY NAME, NO., RATING, SIZE, ETC.

9 8 7 6 5 4 3 2 1 0 — 18

NO. OF COMMODITY ORDERED

| 9 | 8 | 7 | 6 | 5 | 4 | 3 | 2 | 1 | 0 | ×10 |
| 9 | 8 | 7 | 6 | 5 | 4 | 3 | 2 | 1 | 0 | ×1 |

19

ENTER FIGURES — 20

FIG. 5

400 ORDERED COMMODITY CONFIRMATION REQUEST SHEET

0455443468 — 21

RECEIVED AT 11:00 A.M. ON FEBRUARY 15, 1990
CORRECT ERROR IN THE FOLLOWING ITEMS IF NECESSARY

CUSTOMER'S ADDRESS ●○◇◆□■△▲  CUSTOMER NO. = 35402484249

△▲▽▼※☆★○●○◇◆ — 10

CUSTOMER'S NAME ○△▽■▲

TELEPHONE NO. 06-123-4567

CORRECTION CHECK FIELD — 22

① ② ③ ④

- PAYMENT METHOD — AUTOMATIC PAYMENT · CASH
- COMMODITY DELIVERY METHOD — GIFT DELIVERY · HOME DELIVERY · EX STORE
- DELIVERY DATE AND HOUR — AROUND 4:00 P.M. TODAY (PREFERABLY 2:00 P.M.)
- PRESENTATION OF ALTERNATE COMMODITY DUE TO SHORTAGE — YES OR NOT

ALTERNATIVE

① ② ③ ④ ⑤ ⑥ ⑦ ⑧ ⑨ — 22

| COMMODITY NO. | | QUANTITY | PRICE (YEN) |
|---|---|---|---|
| 1234567890 | CHINESE CABBAGE 1/4 | 1 | 128 |
| 2345678901 | SHIITAKE | 2 | 346 |
| 3456789012 | ENOKITAKE | 1 | 88 |
| 4567890123 | JAPANESE RADISH | 1 | 240 |
| 5678901234 | TOFU | 2 | 380 |
| 6789012345 | CHICKEN 200g | 1 | 240 |
| 7890123456 | SHUNGIKU | 1 | 180 |
| ★ 8901234567 | SPORTS SHOES | 1 | 860 |
| 9012345678 | UMBRELLA | 1 | 1980 |
| | DELIVERY FEE | 1 | 200 |

TOTAL (CONSUMPTION-TAX EXCLUDED) 4642

TOTAL (3% CONSUMPTION TAX INCLUDED) 4781

ORDERED CONTENT CONFIRMATION COMPLETION SHEET — 500

CUSTOMER'S ADDRESS ●○◇◆□■△▲  COSTOMER NO.= 35402484249
△▲▽▼✹☆★○●○◇◆

CUSTOMER'S NAME ○△▽■▲

TELEPHONE NO. 06-123-4567

CONFIRMATION CHECK FIELD — 24

① CONFIRMED THAT ORDERED CONTENTS ARE RIGHT

② SEND BROCHURE TO CONFIRM ALTERNATIVE COMMODITY

③ CURRENT ORDER IS CANCELLED DUE TO CORRECTION, ELIMINATION, AND/OR ADDITION, AND NEW ORDER WILL BE MADE

④ OTHERS (SEE FOLLOWING FREE DESCRIPTION FIELD)

FREE DESCRIPTION FIELD

FIG. 9

ORDERED CONTENT CONFIRMATION REQUEST SHEET

0455443468 — 121
RECEIVED AT 2:00 P.M. ON FEBRUARY 15, 1990 — 506

CUSTOMER'S ADDRESS: ●○◇◆□■△▲
△▲▽▼✹☆★○●○◇◆

CUSTOMER NO. = 35402484249 — 110

CUSTOMER'S NAME: ○△▽■▲

TELEPHONE NO. 06-123-4567

CORRECTION CHECK FIELD — 122

| | |
|---|---|
| ① | PAYMENT METHOD | AUTOMATIC PAYMENT·CASH |
| ② | COMMODITY DELIVERY METHOD | GIFT DELIVERY· HOME DELIVERY·EX STORE |
| ③ | DELIVERY DATE AND HOUR | AROUND 4:00 P.M. TODAY (PREFERABLY 4:00 P.M.) |
| ④ | PRESENTATION OF ALTERNATE COMMODITY DUE TO SHORTAGE | YES OR NOT |

ALTERNATIVE — 122

| No. | COMMODITY NO. | | QUANTITY | PRICE |
|---|---|---|---|---|
| ① | 1234567890 | CHINESE CABBAGE 1/4 | 1 | 128 |
| ② | 2345678901 | SHIITAKE | 2 | 346 |
| ③ | 3456789012 | ENOKITAKE | 1 | 88 |
| ④ | 4567890123 | JAPANESE RADISH | 1 | 240 |
| ⑤ | 5678901234 | TOFU | 2 | 380 |
| ⑥ | 6789012345 | CHICKEN 200g | 1 | 240 |
| ⑦ | 7890123456 | SHUNGIKU | 1 | 180 |

DELIVERY FEE    1    200

TOTAL (CONSUMPTION-TAX EXCLUDED)    1 802

TOTAL (3% CONSUMPTION TAX INCLUDED)    1 856

FIG.10

```
 123    507
0455311231    ORDERED CONTENT CONFIRMATION COMPLETION SHEET
CUSTOMER'S   ●○◇◆□■△▲    CUSTOMER NO. = 35402484249
ADDRESS
             △▲▽▼✳☆★○●○◇◆                              —110
CUSTOMER'S   ○△▽■▲
NAME
TELEPHONE NO. 06-123-4567

CONFIRMATION
CHECK FIELD
          124
    ①    CONFIRMED THAT ORDERED CONTENTS ARE RIGHT
    ②    SEND BROCHURE TO CONFIRM ALTERNATIVE COMMODITY
    ③    CURRENT ORDER IS CANCELLED DUE TO CORRECTION,
         ELIMINATION AND/OR ADDITION, AND NEW ORDER WIllBE MADE
    ④    OTHERS (SEE FOllOWING FREE DESCRIPTION FIELD)

APPLY REGISTRATION CARD IN THE FOllOWING FIELD, IF
    CHECKING OF REGISTRATION CARD IS REQUESTED,

FREE DESCRIPTION & REGISTRATION CARD APPLICATION FIELD

—125
```

FIG.14
0451234567
 HOME DELIVERY ORDER SHEET — 509
208
CUSTOMER'S ADDRESS  ●○◇◆□■△▲  CUSTOMER NO. = 35402484249
△▲▽▼✳☆★○●○◇◆
CUSTOMER'S NAME  ○△▽■▲      — 209
TELEPHONE NO. 06-123-4567  PAYMENT METHOD  AUTOMATIC PAYMENT  — 210
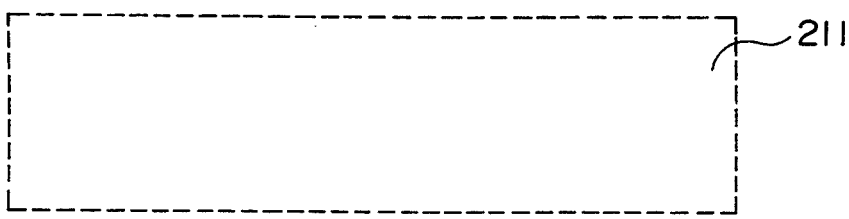 — 211
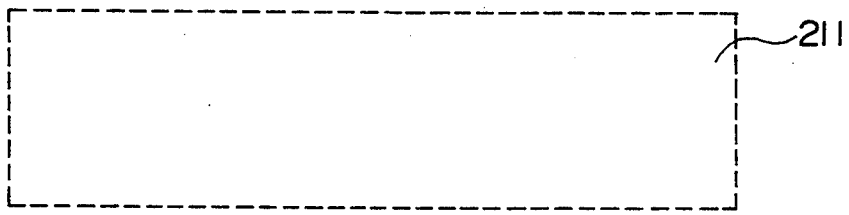 — 211
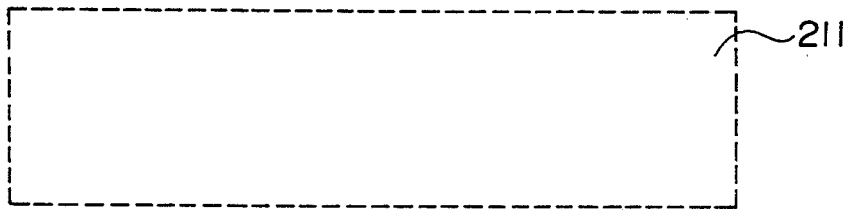 — 211
CHECK EITHER FIGURE BELOW BY SMEARING IT WITH PENCIL TO DISTINGUISH FINAL PAGE OR ADDITIONAL PAGE PRESENT
FINAL PAGE  — 212    ADDITIONAL PAGE PRESENT 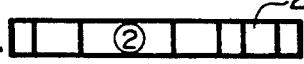 — 212

511 COMMODITY ORDER LABEL

COMMODITY NAME
COMMODITY NO.
RATING, SIZE, ETC.

NO. OF COMMODITY ORDERED

| 9 | 8 | 7 | 6 | 5 | 4 | 3 | 2 | 1 | 0 | ×10 |
|---|---|---|---|---|---|---|---|---|---|-----|
| 9 | 8 | 7 | 6 | 5 | 4 | 3 | 2 | 1 | 0 | ×1  |

252

1
3
8
6
4
2

251

ENTER FIGURES

513 COMMODITY ORDER LABEL

COMMODITY NAME
COMMODITY NO.
RATING, SIZE, ETC.

9 8 7 6 5 4 3 2 1 0 — 317

NO. OF COMMODITY ORDERED

| 9 | 8 | 7 | 6 | 5 | 4 | 3 | 2 | 1 | 0 | ×10 |
| 9 | 8 | 7 | 6 | 5 | 4 | 3 | 2 | 1 | 0 | ×1 |

318

ENTER FIGURES — 319

$\Theta = \sin^{-1} \dfrac{y}{x}$

AUTOMATIC FACSIMILE-RECEIVING-SHEET RECOGNIZING APPARATUS

BACKGROUND OF THE INVENTION

1. Field of the Invention

The present invention relates to an automatic facsimile-receiving-sheet recognizing apparatus for an automatic order receiving and sales control system by utilizing facsimile machines capable of automating an operation of receiving an order from an orderer, for example, between ordinary homes and a supermarket, between retail stores and wholesale store, between wholesale stores and a manufacturer, or between ordinary homes and a mail-order firm, in order to automate and rationalize the overall sales operation by utilizing information between the same and realizing a service system such that a customer is able to purchase commodities of a supermarket although the customer is at home.

2. Related Art

Hitherto, an ordinary system of the type described above has been constituted in such a manner that a telephone or a mail service is utilized or a customer goes shopping to a shop. Even if the facsimile machine is utilized, the object of it is to short the time taken to complete the shopping process in such a manner that an order slip is, as an alternative to the mail, transmitted by the facsimile machine.

In a case of an institutional system, although there are a certain number of automated order giving and receiving systems constituted by means of an on-line communication system arranged between exclusive terminals disposed at the orderers and a central computer of the order receiver, the automated order receiving operation system has not been widely used as yet.

On the other hand, the major portion of the conventional automatically recognizing apparatus uses an OCR (Optical Character Reader). If cutting or recognition of information cannot be performed, the subject portion is displayed on a display monitor so as to be supplied with information or corrected by an operation performed by an operator. Therefore, if hand-written characters written by many and unspecified persons must be recognized, many portions may be possibly recognized. As a result, the labor for the operator cannot be reduced.

In the above-described case of the on-line system established between the exclusive terminals and the center computer, the terminals must be disposed to the orderer which are the customers. Therefore, it cannot be easily established in a case where the customers are many and unspecified ordinary homes. Even if personal computers which have been widely used are, as an alternative to the exclusive terminals, employed to establish a communication with the computer of the order receiver, the manipulatability of the personal computer and the method of inputting the commodities to be ordered are complicated and troublesome. Therefore, it cannot be easily widely used by ordinary persons.

Furthermore, if the order receipt slip is erroneously recognized, the transfer of the commodity and money are affected to a degree which cannot be easily modified. Therefore, the automatic and unmanned system for recognizing the image formed by the hand-written characters and received by the facsimile machine encounters problems of unsatisfactory accuracy and long process time even if the accuracy of the OCR can be improved.

SUMMARY OF THE INVENTION

Accordingly, an object of the present invention is to provide an automatic facsimile-receiving-sheet recognizing apparatus capable of overcoming the above-described problems experienced with the conventional structures and correctly automatically recognizing the contents of an order sheet or the like transmitted by a facsimile machine so as to automatically receive an order and to manage the sales operation by utilizing the facsimile machine.

In order to achieve the above-described object, according to one aspect of the present invention, there is provided an automatic facsimile-receiving-sheet recognizing apparatus comprising: means for automatically receiving facsimile information transmitted from an orderer; means for detecting the position of a bar code, a mark sheet and a figure in a received sheet and automatically extracting their images; and means for automatically recognizing the cut bar code, the mark sheet and the figure and transmitting the result of the recognition to a store controller of an automatic order receiving and sales control system.

According to the present invention, the format of each sheet and the processing method of the recognizing apparatus are arranged to correspond to each other so as to establish an automatic recognizing system.

The portions each of which must be extracted or cut out are formed into a format in such a manner that its two end portions are surrounded by bar codes (except for the case where the bar code is the subject to be recognized).

The subjects to be recognized are bar codes, the mark sheet the frame of which is smeared by black pencil and figures, wherein the hand-written figures are, together with the mark sheet, used simply to confirm information about the mark sheet.

Therefore, according to the present invention, the items to be recognized are cut after recorded information about the format has been detected. As a result, double checking is performed, allowing the accuracy in the cutting operation to be improved. In addition, the bar code can easily be recognized. Furthermore, since an error detection bar is provided and the figures are as well as recognized, the accuracy in the recognition can be improved satisfactorily. In addition, the figures of the mark sheet can be discriminated in accordance with the position of the frame which is smeared black and the printed figures disposed adjacent to the subject figures are also recognized. Therefore, a triple checking system can be established including the recognition of the hand-written figures. As a result, the accuracy in the recognition can be satisfactorily improved.

Other and further objects, features and advantages of the invention will be appear more fully from the following description.

BRIEF DESCRIPTION OF THE DRAWINGS

FIG. 2 illustrates an example of a home delivery order sheet;

FIG. 3 illustrates an example of a delivery request order sheet;

FIG. 4 illustrates an example of a commodity order label;

FIG. 5 illustrates an example of an ordered content confirmation request sheet;

FIG. 6 illustrates an example of an ordered content confirmation completed sheet;

FIG. 9 illustrates an example of the ordered content confirmation request sheet;

FIG. 10 illustrates an example of the ordered content confirmation completion sheet;

FIG. 14 illustrates an example of the home delivery order sheet;

FIG. 15 illustrates an example of the commodity order label;

FIG. 17 illustrates another example of the commodity order label;

FIG. 19 illustrates an example of the commodity order label;

DETAILED DESCRIPTION OF PREFERRED EMBODIMENTS

First Embodiment

Figure 1:
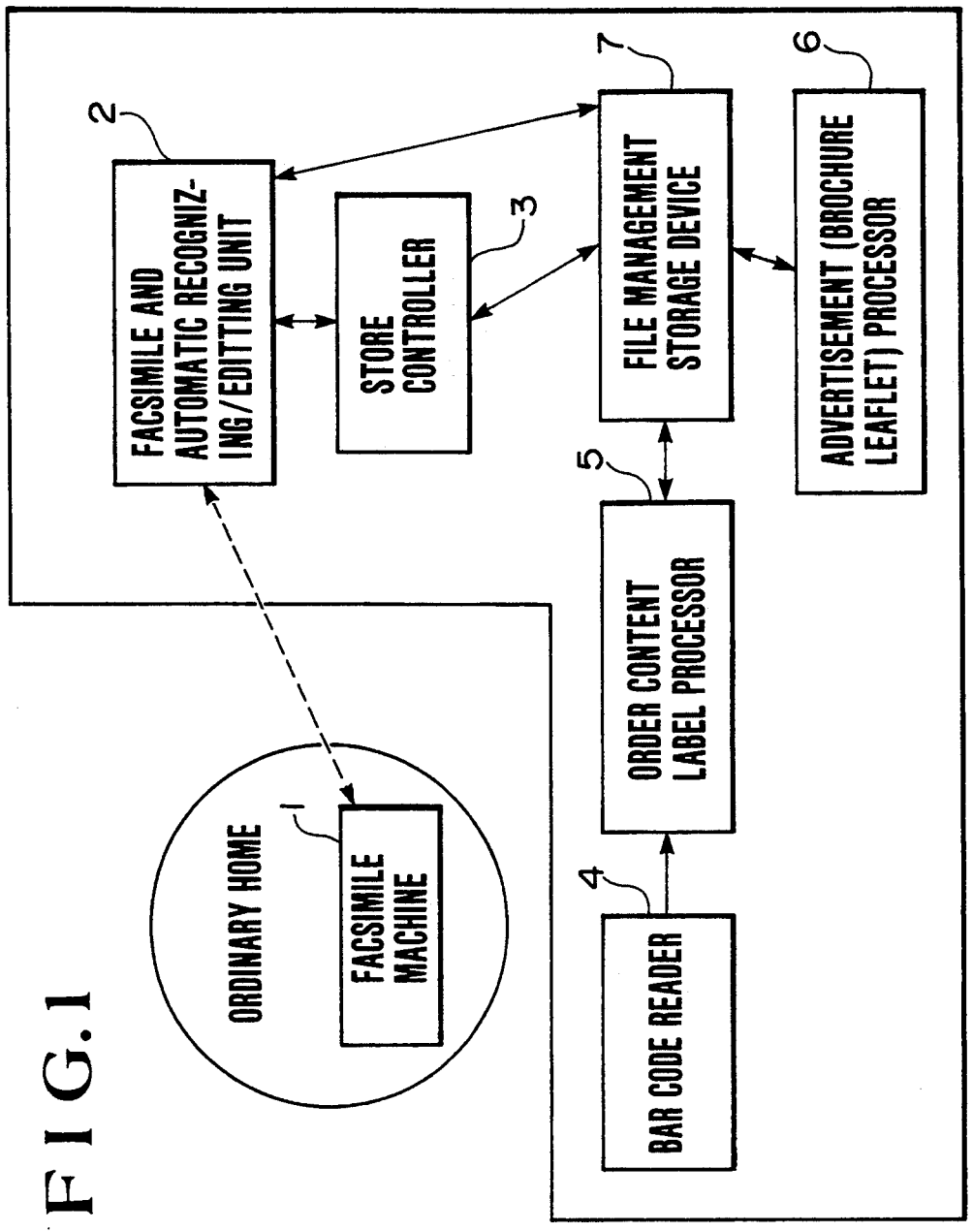
FIG. 1 is a block diagram which illustrates an example of an automatic order receiving and sale management system by utilizing facsimile machine system disposed between ordinary home and a supermarket according to the present invention.

FIG. 1 illustrates the structure of an embodiment of an automatic order and sales management system according to the present invention which utilizes a facsimile machine connected between an ordinary home and a supermarket.

Referring to FIG. 1, reference numeral 1 represents a facsimile machine disposed in an ordinary home, 2 represents a facsimile and automatic recognizing/formatting unit disposed in a supermarket and 3 represents a store controller for controlling the overall sales operation performed in the supermarket. Reference numeral 4 represents a reader for reading a bar code given to a commodity, 5 represents a commodity order label processor, 6 represents an advertisement processor for processing a brochure, a leaflet or the like and 7 represents a common file management storage unit.

The facsimile and automatic recognizing/formatting unit 2 comprises a facsimile machine, a unit for detecting the position of the bar code and that of the mark sheet to automatically recognize them and a unit for printing an entry of required information items on a paper sheet of a predetermined form. The store controller 3 processes a variety of functions assorted into stock management, receipt order information management, order management, account management, physical distribution management customer information management sales management and the like. The bar code reader 4 is able to recognize the JAN code standardized as commodity recognition code or the like. Thus, in accordance with the bar code read out by the bar code reader 4, the commodity order label processor 5 processes a commodity order label arranged as shown in FIG. 4 for each commodity before the file management storage unit 7 stores it as data. Furthermore, the advertisement brochure and leaflet processor 6 prints it on the brochures and the leaflets to be distributed to the subject homes.

Figure 2:
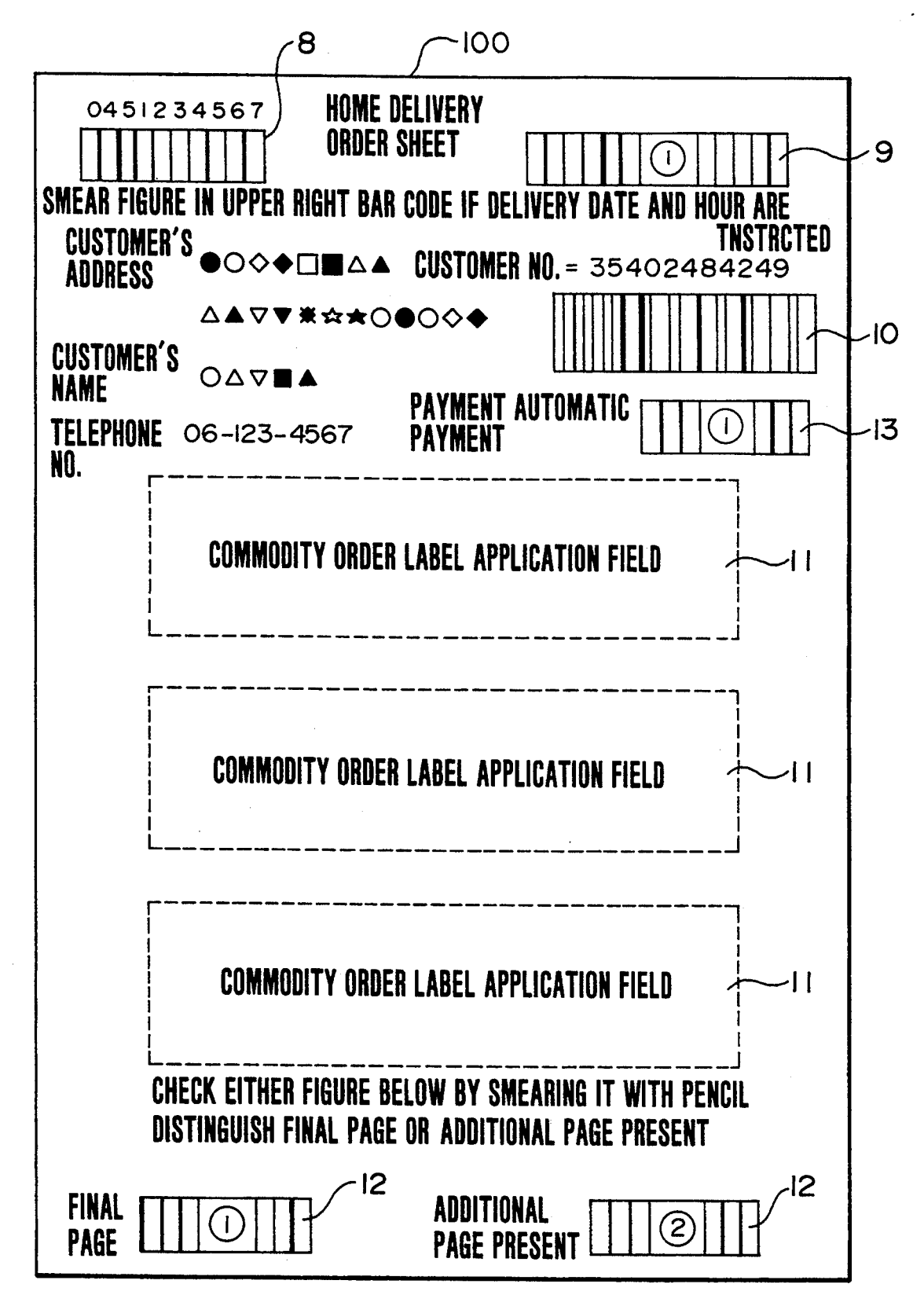

FIG. 2 illustrates an example of a home delivery order sheet 100 for use when a home delivery is required. Reference numeral 8 represents a bar code denoting a fact that the subject sheet is the home delivery order sheet 100. In a case where the ordered commodity is received at the supermarket, a packing requirement order sheet (omitted from illustration) is used which is arranged into the same format as the above-described sheet except for the bar code 8 shown in FIG. 2. Reference numeral 9 represents a bar code arranged in such a manner that marking is performed by smearing a figure held between two bar codes with a black pencil in only a case where delivery date and hour are instructed (hereinafter marking of the type described above is called a marking bar code). In a case where the delivery date and hour are instructed, the required date and hour are instructed by a similar marking bar code method in accordance with a required delivery date and hour instruction sheet. Reference numeral 10 represents a par code denoting a customer No. when an orderer is registered and 11 represents a field to which a commodity order label 300 is applied. Reference numeral 12 represents a marking bar code with which whether the subject sheet is the final sheet at this ordering action or a further sheet remains is denoted by smearing the figure with a black pencil. Reference numeral 13 represents a marking bar code for use in a case where the payment method is not the cash payment but the payment is automatically made from an account register, which is represented by such a manner that a figure is smeared with a black pencil.

FIG. 3 illustrates an example of a delivery request order sheet 100 for use in a case of, for example, a present in which there is a requirement to directly deliver the commodity to an instructed place. Reference numeral 14 represents a bar code denoting a fact that the subject sheet is the delivery request order sheet 200. Reference numeral 15 represents an entry space in which the address, name and telephone number of a receiver are written. Reference numeral 16 represents a delivery request date instructing marking bar code arranged in such a manner that the figures of the month and the day are smeared with a black pencil in a case of the delivery date is instructed. Reference numeral 17 represents a figure entry space in which figures of the requested day is put.

FIG. 4 illustrates an example of a commodity order label 300 which is used in such a manner that it is separated from the brochure or the like so as to be applied to the commodity order label application field 11 shown in FIG. 2 or 3. Reference numeral 18 represents a commodity order bar code, 19 represents a marking bar code for instructing the number of the ordered commodities and 20 represents a field in which the number of the ordered commodities is entered. According to this example, commodities can be ordered up to 99 in number.

FIG. 5 illustrates an example of an ordered content confirmation request sheet 400. Referring to FIG. 5, reference numeral 21 represents a bar code denoting that the subject sheet is the ordered content confirmation request sheet 400. Reference numeral 22 represents a marking bar code formed in an ordered content correction check field 22 and arranged to be checked if the contents of the sheet 400 are different from the ordered contents.

The ordered content correction check field 22 is used in a case, for example, where the payment method is required to be corrected or changed from the "automatic payment" to the "cash payment. In this case the figure in the "payment method" is smeared with a black pencil and as well as the characters "automatic payment" written in the right portion of the above-described figure is corrected with a double line. A "commodity delivery/receipt method" is similarly corrected. A "delivery day and hour" field is a field in which the required delivery day and hour is put. A field of "presentation of alternative commodity due to shortage" is arranged in such a manner that an alternative commodity is shown with a mark "*" (according to an example shown in FIG. 5, sports shoes are concerned in a case where it has been discriminated as a result a confirmation of the stock that the commodity, which has been previously ordered by the orderer, runs short. Therefore, in a case where the orderer requires the alternative commodity, the orderer selects "yes" and a corresponding commodity is selected from the commodities which can be ordered shown in the lower field and a figure in the correction field 22 is smeared.

Referring to FIG. 6 which illustrates an example of an ordered content confirmation completion sheet 500, reference numeral 23 represents a bar code denoting a fact that the subject sheet is the ordered content confirmation completion sheet 500. Reference numeral 24 represents an ordered content confirmation check field.

The ordered content confirmation check field 24 is a field with which the following contents are confirmed: "a fact that the ordered content is corrected has been confirmed", "send a brochure to confirm the alternative commodity", "previous order is cancelled because of correction, elimination and/or addition, and an order is again made" and "others (refer to the following free description field".

Figure 7:
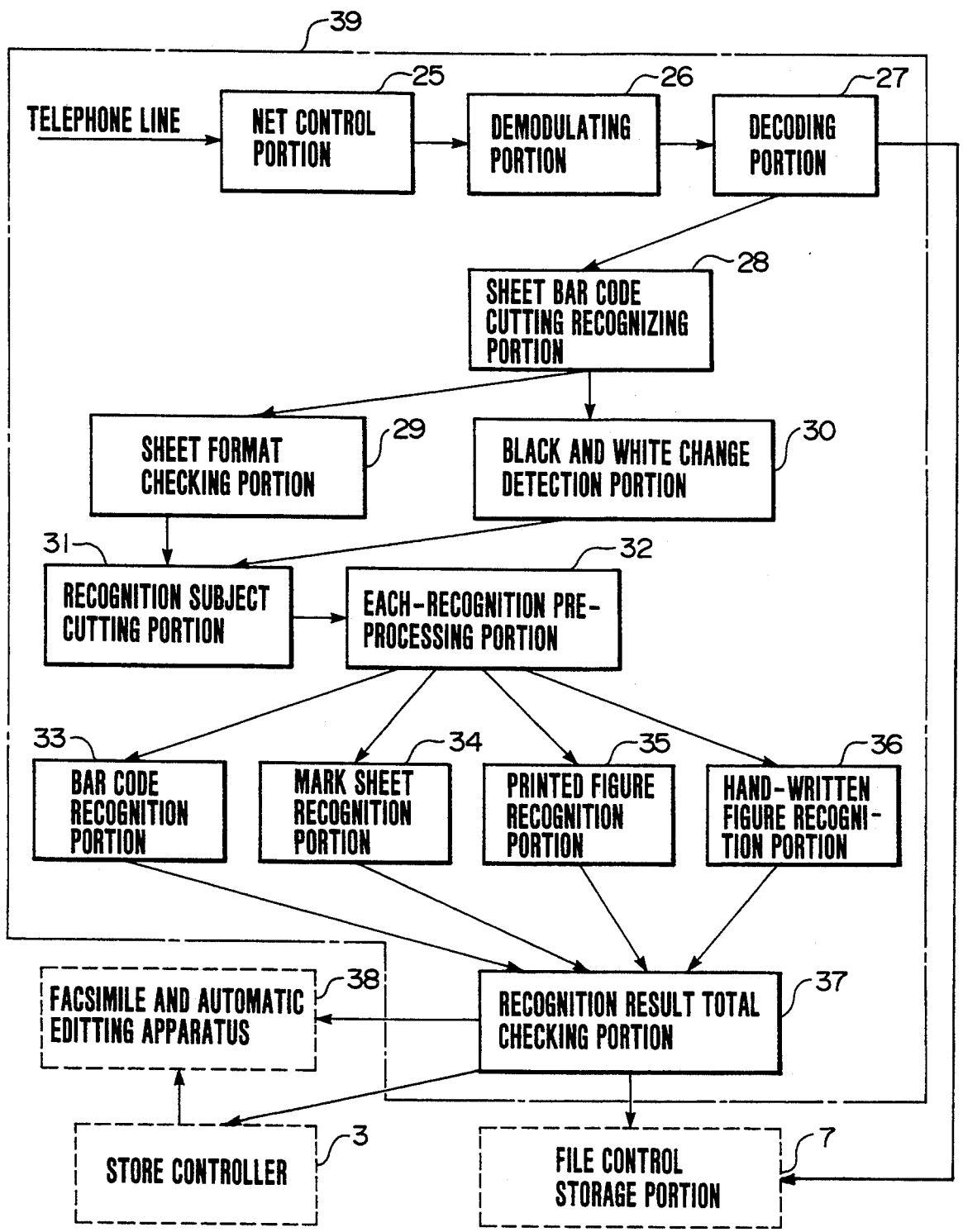
FIG. 7 is a block diagram which illustrates an automatic facsimile-receiving-sheet recognizing apparatus.

FIG. 7 is a block diagram which illustrates an automatic facsimile sheet recognizing device 39 of the facsimile and automatic recognizing/editing unit 2 shown in FIG. 1. Referring to FIG. 7, reference numerals 25 to 37 represent elements having functions of the above-described device 39. A structure including a facsimile and automatic editing device 38 is equivalent to the facsimile and automatic recognizing/editing device 2 shown in FIG. 1.

Referring to FIG. 7, reference numeral 25 represents a net control portion, 26 represents a demodulating portion, 27 represents a decoding portion, 28 represents a sheet bar code cutting and recognizing portion, 29 represents a sheet format checking portion, 30 represents a black and white change detection portion, 31 represents a recognized subject cutting portion, 32 represents an each-recognition preprocessing portion, 33 represents a bar code recognizing portion, 34 represents a mark sheet recognizing portion, 35 represents a printed figure recognizing portion, 36 represents a hand-write figure recognizing portion and 37 represents a recognized result total checking portion.

Figure 8:
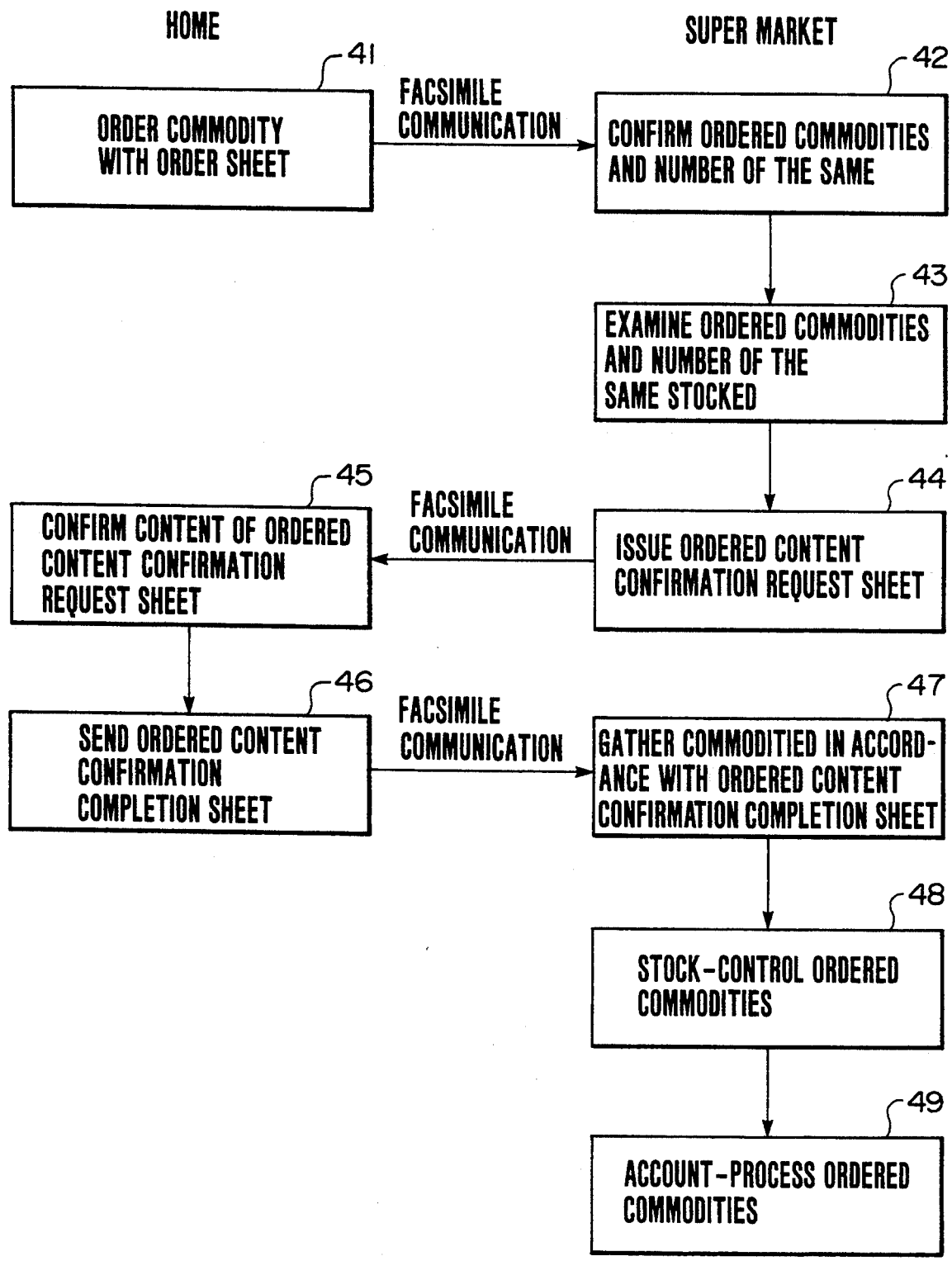
FIG. 8 is a flow chart which illustrates the basic operation of an automatic order receiving and sale control system according to the present invention.

Then, the basic operation of this embodiment thus-constituted will now be described with reference to an operational flow chart shown in FIG. 8. First, each home uses the home delivery order sheet 100 or the delivery request order sheet 200 to order a commodity with the facsimile machine (step 41). The supermarket, which has received the order thus-made, confirms the commodity ordered and the number of it shown on the order sheet (step 42). Then, the status of the stock of the ordered commodity and the number of the same are examined (step 43) before the ordered content confirmation request sheet 400 including the result of the examination is issued and sent it to the home with the facsimile machine (step 44). The home, which has received it, confirms the contents (step 45) before it sends the ordered content confirmation completion sheet 500 to the supermarket through the facsimile machine (step 46). The supermarket, which has received it, gathers the ordered commodities in accordance with the contents of the ordered content confirmation completion sheet 500 (step 47). Then, the supermarket performs the stock management operation, such as a novel supplementation (step 48). Then, the account operation such as the processing of a bill and a sales slip and the automatic payment operation and the like are performed (step 49).

Then, a further specific operation of the above-described embodiment will now be described. For example, a consideration is made about a case in which a customer of an ordinary family purchases foodstuffs for a dinner and daily necessaries from a supermarket which is shown in FIG. 1 and to which the customer is registered. An assumption is made that the ordered commodities are delivered to the home, the payment is made in cash and the required delivery time is two o'clock p.m.

In this case, the commodity order label 300 of the subject commodity shown in FIG. 4 is applied to the home delivery order sheet 100 shown in FIG. 2 and received from the supermarket at the time of the customer registration process. Then, the necessary items are filled in the above-described sheet so as to be transmitted to the supermarket.

The commodity order label 300 is cut directly or after copying from the brochure or the leaflet so as to be applied to the commodity order label application field 11 of the home delivery order sheet 100.

If the same commodity of the subject commodity has been purchased from the supermarket, the commodity order label corresponding to the commodity can be used if it has been given at the time of the previous purchase process. If the same dish is prepared at the previous order, the home delivery order sheet 100, which has been used at the previous order, can be used.

The commodity order label 300 is arranged in such a manner that the marking bar code 19 and the ordered commodity number field 20 can be filled up with the number of the ordered commodities. The marking bar code 19 is entered in such a manner that the figures of the number of the ordered commodities respectively corresponding to a ten digit and a one digit are smeared with a black pencil. The ordered commodity number field 20 is filled with Arabic figures.

The marking bar codes 9 and 12 of the home delivery order sheet 100 must be marked. The marking bar code 9 is marked so as to require the delivery at two o'clock p.m in such a manner that a figure in a square disposed between two bar codes is smeared with a block pencil. Since the individual required delivery date and hour instruction sheets is present in this case, the requirement of home delivery at two o'clock is marked by the marking bar code method, and is transmitted together with the order sheet 100 though the facsimile device 1. The marking bar code 12 is marked in such a manner that, the right marking bar code of each of the intermediate order sheets 100 is smeared and the left marking bar code of the final order sheet 100 is smeared because a plurality of the order sheets 100 must be used in a case where the number of the commodity order labels 300 is large before the order sheets 100 are transmitted. The marking bar code 13 is not marked in this case because the payment is made in cash.

The supermarket receives it by the facsimile and automatic recognizing/editing unit 2. Referring to FIG. 7, compressed data transmitted to the net control portion 25 through a public telephone line is demodulated into a digital signal by a modem of the demodulating portion 26. Then, it is decoded into image digital data by the decoding portion 27. Then, the order sheet bar code 8 of the home delivery order sheet 100 is recognized by the sheet bar code cutting and recognizing portion 28 so that a fact that the subject sheet is the home delivery order sheet 100 is understood.

The sheet format checking portion 29 transmits data denoting the cut position to the recognition subject cutting portion 31 in accordance with the result of the recognition made by the sheet bar code cutting and recognizing portion 28.

Also the black and white change detection portion 30 transmits data denoting the position of the cut bar code or the marking bar code to the recognition subject cut portion 31.

The recognition subject cut portion 31 checks data transmitted from the sheet format checking portion 29 and the black and white change detection portion 30 so as to cut only the portion to be recognized.

The each-recognition pre-processing portion 32 subjects the cut portion to a normalization of the size of the character or the like and correction of the gradient so that data about the subject to be recognized is transmitted to the bar code recognizing portion 33, the mark sheet recognizing portion 34, the printed-figure recognizing portion 35 and the hand-written figure recognizing portion 36 depending upon the subject to be recognized.

Since each subject to be recognized is formed into binary data and each hand-written character is in the form of a figure having no break, they can easily be recognized. The printed figures except for the hand writing figures can be recognized at high speed by performing a collation with a dictionary pattern having no redundancy. The characteristic extraction process is also used to recognize the hand-written figures. The result of the above-described recognition performs a supplement role for confirming the marking bar code recognition result.

The result of each recognition is totally discriminated by the recognition result total checking portion 37 before it is, with information about recognition disable information due to an error and omission, transmitted to the store controller 3.

Image data and the result of the recognition thus-received are, confirmation evidence, stored in the file control storage device 7.

The store controller 3 performs processes such as a stock checking operation in accordance with recognition result information thus-transmitted before it transmits information to the facsimile and automatic editing device 38.

The facsimile and automatic editing device 38 processes the ordered content confirmation request sheet 400 shown in FIG. 5 in accordance with data transmitted from the recognition result total checking portion 37 and the store controller 3 so as to transmit it to the facsimile device 1 of the orderer home.

The orderer home receives and confirms the contents of the ordered content confirmation request sheet 400. If there is a difference from the ordered contents, the figure of the corresponding item in the correction checking field 22 is smeared so as to correct the content before the above-described sheet is transmitted to the facsimile and automatic recognition/editing device 2 of the supermarket. As an alternative to this, the commodity order label in the corrected portion is applied to the individual ordered content correction sheet before this sheet is transmitted by the facsimile device. If the ordered contents are correct, the subject field in the confirmation checking field 24 of the ordered content confirmation completion sheet 500 shown in FIG. 6 is marked before this sheet is transmitted to the facsimile and automatic recognizing/editing device 2 of the super market.

When the supermarket receives the corrected ordered-content confirmation request sheet 400 shown in FIG. 5 , it modifies the corrected item before the above-described sheet is again transmitted to the home. In only a case in which the supermarket receives the ordered content confirmation completion sheet 500 shown in FIG. 6 and as well as the marking code of the "confirmation of a fact that ordered content is correct is made" field is marked, the order can be completed.

Referring to FIG. 5, the shoes among the ordered commodities are alternative commodities presented in accordance with a discrimination made upon data about the previously-purchased commodities and the family make-up stored in a customer file possessed by the supermarket. Therefore, the alternative commodity mark (*) is given. The customer makes a reference to the brochure to detect the commodity No. of the alternative commodity shown in the above-described ordered content confirmation request sheet 400. If the brochure is not present, the customer is able to request it to be sent through the facsimile device by using the ordered content confirmation completion sheet 500. In a case where the alternative commodity is a commodity which is not shown on the ordinary brochure or a novel commodity, an individual ordered-commodity change request sheet in which the alternative commodity is described is also transmitted when the ordered content confirmation request sheet 400 is transmitted to the home. In this case, the confirmation efficiency of the alternative commodity can be improved.

In a case where the customer wants to directly confirm a commodity to be purchased, the home delivery order sheet 100 is not used but it is ordered by the facsimile by using the packing request order sheet (omitted from illustration). As a result, the ordered commodity can be received at the register portion in the supermarket so that the commodity can be confirmed while eliminating a necessity of standing in a queue at the register position. Therefore, the time required to stand in a queue can be eliminated.

In a case where the commodity is a gift, the address, name and the telephone number of the receiver are entered in the receiver field 15 of the delivery request order sheet 200 shown in FIG. 3. Furthermore, the required delivery date is marked in the marking bar code 16 and entered in the figure entry field 17 before the sheet 200 is transmitted to the supermarket by the facsimile device.

The facsimile receipt sheet automatic recognition device 39 processes the receiver entry field 15 in which the address and the like of the receiver in such a manner that image data in the portion held by the bar codes is cut for the purpose of processing a delivery instruction sheet. Therefore, the necessity of recognizing the written characters can be eliminated.

Since various sorts of the sheets are received by the automatic recognizing device 39, it first recognizes the sort of the subject sheet by its sheet bar code cutting and recognizing portion 28 when it receives the sheet.

In a case where the contents of the correction is allowed to be written by the hand in the ordered content recognition request sheet shown in FIG. 5, or in a case where the free description field is formed as shown in FIG. 6, it is omitted from the automatic recognition operation. Therefore, an exceptional process must be performed in which, for example, the subject portion is cut and is displayed on a display so as to be checked by an operator.

The following technical effects can be obtained from the first embodiment.

(1) If a facsimile machine is possessed, the orderer is able to order commodities by a simple process while confirming the commodity and the delivery date. If the delivery service is provided according to this embodiment, a system can be realized with which a labor of go-shopping and looking for the commodity can be saved.

(2) In a case where the commodities to be purchased are not considerably different from the previously made order, for example, in a case where the similar commodities are required because the same cooking is performed, the orderer is able to order the commodities by a simple operation in which the commodity order label and the quantity of the commodities are partially modified in the order sheet.

(3) The sales shop such as a supermarket is able to constitute an unmanned order receipt system by using the automatic recognizing device according to the present invention except for the exceptional operations.

(4) Since the bar codes and the marking bar codes are used in the order sheet and the like, the items to be recognized can be cut by a single simple process in which the black and white bar codes are detected. Therefore, the above-described process can be completed correctly at a high speed.

(5) Since only the figures are used in the recognition operations, the pattern matching process can, if performed, be completed in a short time because the number of the dictionaries can be reduced and the required number of the collation operations can be decreased. Furthermore, since each figure has no break, the frame decision work and the characteristic extraction work of it at the time of normalizing the size or the like can be easily completed in comparison with the other sorts of characters.

(6) Since the marking bar code is recognized by checking whether or not the figure put in a frame can be recognized, the necessity of fully smearing the overall body of the frame at the time of the marking operation can be eliminated. It is merely required to cover the figures, causing the marking work to easily be completed because of a clear object.

(7) Since the system is arranged in such a manner that the contents recognized and understood by the automatic recognizing device is returned to the orderer so as to be confirmed, the error generation can significantly be prevented.

Second Embodiment

In the case of the above-described on-line system established between the exclusive terminals and the center computer, an input terminal must be provided at the orderer, who is a limited customer, and the orderers must master the operational method. Therefore, an unlawful order can be prevented satisfactorily, and even if the unlawful order takes place, an offender can be relatively easily detected because the orders are limited.

On the other hand, in a case of an automatic order system established between many and specified ordinary homes and the supermarket by utilizing the facsimile machines, the commodity can be ordered by an easy method and procedure in order to make the system to be widely used. Furthermore, it is preferable that the facsimile machine for giving an order is not limited and commodities can be ordered from any facsimile machine. However, it leads to a fact that a false order can easily be given due to tampering of the facsimile machine or an unlawful purpose.

If no prevention means against the unlawful operation were provided, the false order should be detected at the time of the delivery to the home after the commodities have been gathered. In a case where the payment of the ordered commodities is made by the automatic payment system, additional labor for the cancellation must be required. Therefore, both of the orderer and the sales shop excessively suffer due to an unlawful order of the type described above.

A second embodiment is capable of overcoming the above-described problem experienced with the conventional system. Accordingly, an object of this embodiment is to provide a facsimile receiving sheet automatic recognizing apparatus provided with a checking function of preventing an unlawful use and capable of confirming the orderer.

In order to achieve the above-described object, the apparatus according to this embodiment comprises means for detecting the facsimile machine No. of a sender of the order sheet or the like, means for facsimile-transmitting a processed confirmation request sheet to the detected sender, means for recognizing a registration card which has been facsimile-transmitted from the sender and means for collating the result of the recognition and the registered No.

At the time of the customer registration, the customer has the code number and the facsimile machine number registered and as well as selects any of the following conditions. Furthermore, a conditional selection may be employed in which, for example, condition (1) is selected in a case where the total purchase accounts to less than 5000 yen and as well as condition (4) is selected in the other cases.

(1) Checking of both of the No. of the sender and that of the registration card are not required.

(2) Only checking of the No. of the sender is required.

(3) Only checking of the registration card is required.

(4) Checking of both of the No. of the sender and that of the registration card are required.

(5) Checking of the No. of the sender is required and as well as checking of the registration card is not required. However, in a case where an abnormal fact has been detected in checking the No. of the sender, the registration card must be checked.

In a case where the No. of the sender is checked, the facsimile machine for transmitting information is limited. In a case where the registration card is checked, a labor is required for applying the registration card to the ordered content confirmation completion sheet at the time of the order process.

The customer No. of the customer registered is entered in the registration card and as well as a code No. registered is entered in the form of a special bar code.

Furthermore, the above-described registration card is applied to a bar code field of the ordered content confirmation completion sheet to be transmitted at the time of confirming the ordered content so as to be facsimile-transmitted.

Therefore, according to this embodiment, the degree of checking can be controlled on the automatic recognizing device side by selecting the convenience for the customer or the prevention of an unlawful operation in accordance with the customer's request.

In a case where the No. of the sender is checked, the No. of the sender detected at the time of receiving the order sheet and the registered facsimile machine No. detected at the time of automatically recognizing the order sheet and fetched by referring to a registration file from the customer No. are subjected to a collation so that a fact that the facsimile machine which has transmitted to the order sheet is the registered machine can be confirmed.

When the registration card is checked, the code bar code in the registration card portion interposed between bar codes is cut and recognized at the time of the operation of receiving the ordered content confirmation completion sheet performed by the automatic recognizing device. It is then collated with the code No. fetched from the customer No., which has been similarly recognized, by making a reference to the registration file. As a result, whether or not the subject order operation is unlawful operation can be checked.

FIG. 9 illustrates an example of an ordered content confirmation request sheet 506. Referring to FIG. 9, reference numeral 121 represents a bar code denoting that the subject sheet is the ordered content confirmation request sheet 506. Reference numeral 122 represents a marking bar code formed in an ordered content correction check field 22 and arranged to be checked if the contents of the sheet 506 are different from the ordered contents.

The ordered content correction check field 122 is used in a case, for example, where the payment method is required to be corrected or changed from the "automatic payment" to the "cash payment in such a manner that the figure in the "payment method" is smeared with a black pencil and as well as the characters "automatic payment" written in the right portion of the above-described figure is corrected with a double line. A "commodity delivery/receipt method" is similarly corrected. A "delivery date and hour" field is a field in which the required delivery date and hour are entered. A field of "presentation of alternative commodity due to shortage" is arranged in such a manner that an alternative commodity is shown with a "*" mark in a case where such a fact has been discriminated, as a result of a confirmation of the stock, that the commodity, which has been previously ordered by an orderer, runs short. Therefore, in a case where the orderer requires the alternative commodity, the orderer selects "yes" and a corresponding commodity is selected from the commodities which can be ordered shown in the lower field and a figure in the correction field 22 is smeared.

FIG. 10 illustrates an example of an ordered content confirmation completion sheet 507. Referring to FIG. 5, reference numeral 123 represents a bar code denoting a fact that the subject sheet is the ordered content confirmation completion sheet 507. Reference numeral 124 represents an ordered content confirmation check field and 125 represents a free description field and a field to which the registration card is applied.

The ordered content confirmation check field 124 is a field with which the following contents are confirmed: "a fact that the ordered content is correct has been confirmed", "send a brochure to confirm the alternative commodity", "previous order is cancelled because of correction, elimination and/or addition, and order is again made" and "others (refer to the following free description field".

Figure 11:
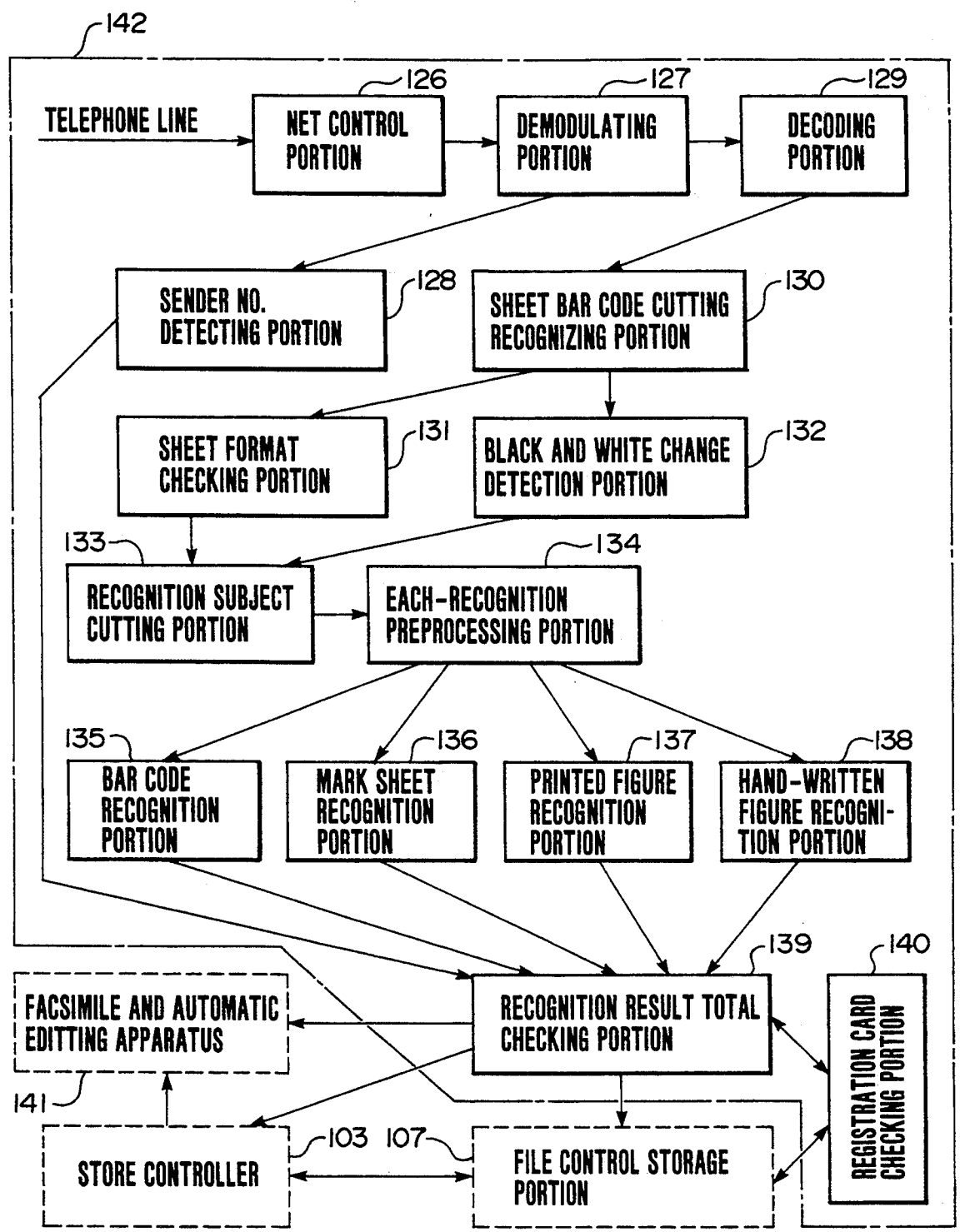
FIG. 11 is a block diagram which illustrates an automatic facsimile-receiving-sheet recognizing apparatus provided with an unlawful use checking function.

FIG. 11 is a block diagram which illustrates a facsimile receipt sheet automatic recognizing device 142 provided with an unlawful use checking function of the facsimile and automatic recognizing/editing device 2 shown in FIG. 1. Referring to FIG. 11, reference numerals 126 to 140 represent elements having functions of the above-described device 142. A structure including a facsimile and automatic editing device 141 is equivalent to the facsimile and automatic recognizing/editing unit 2 shown in FIG. 1.

Referring to FIG. 7, reference numeral 126 represents a net control portion, 127 represents a demodulating portion, 128 represents a sender No. detection portion, 129 represents a decoding portion, 130 represents a sheet bar code cutting and recognizing portion, 131 represents a sheet format checking portion, 132 represents a black and white change detection portion, 133 represents a recognized subject cutting portion, 134 represents an each-recognition preprocessing portion, 135 represents a bar code recognizing portion, 136 represents a mark sheet recognizing portion, 137 represents a printed figure recognizing portion, 138 represents a hand-write figure recognizing portion, 139 represents a recognized result total checking portion and 140 represents a registration card checking portion.

Figure 12:
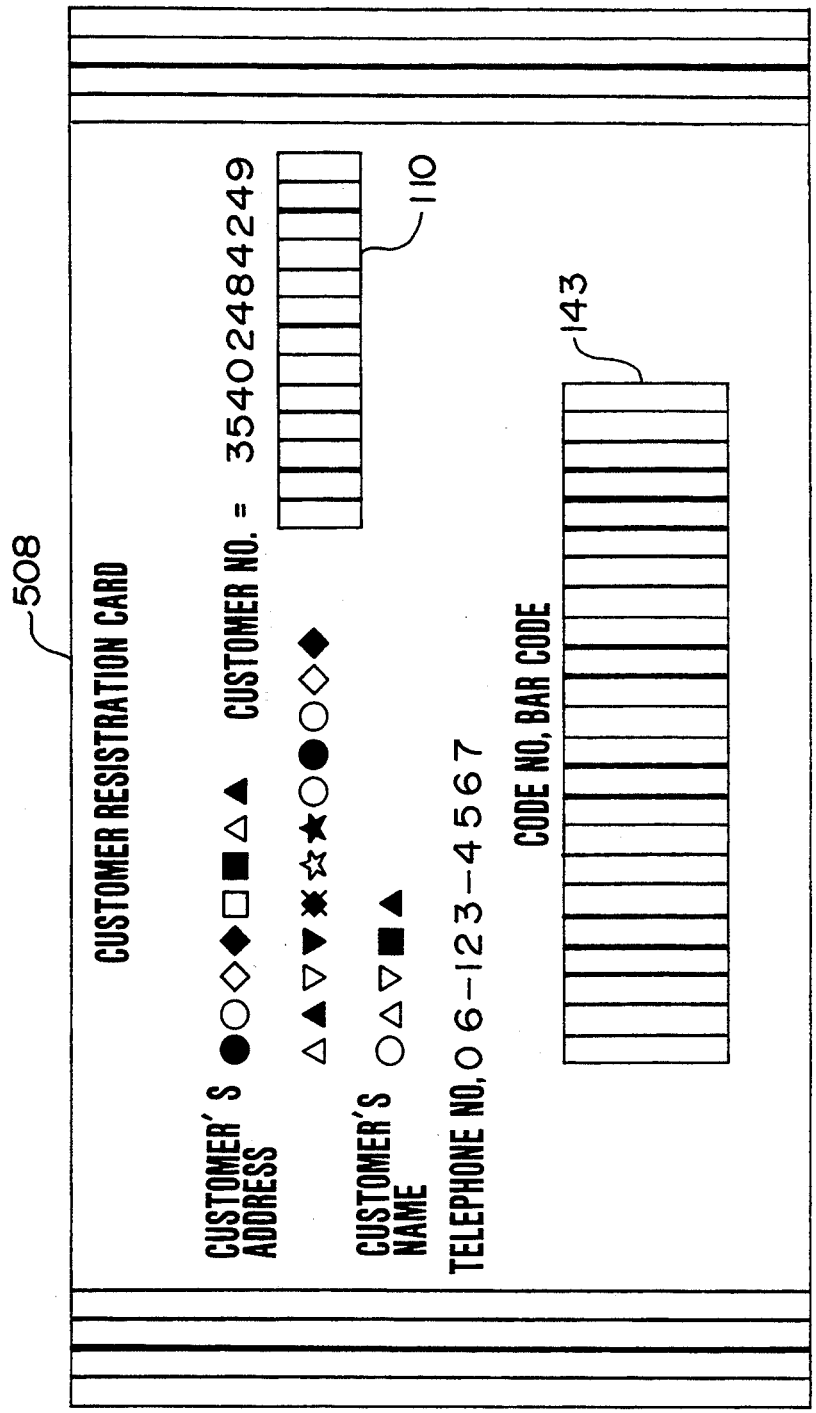
FIG. 12 illustrates an example of a customer registration card.

FIG. 12 illustrates an example of a customer registration card, where reference numeral 143 represents a code No. bar code.

Figure 13:
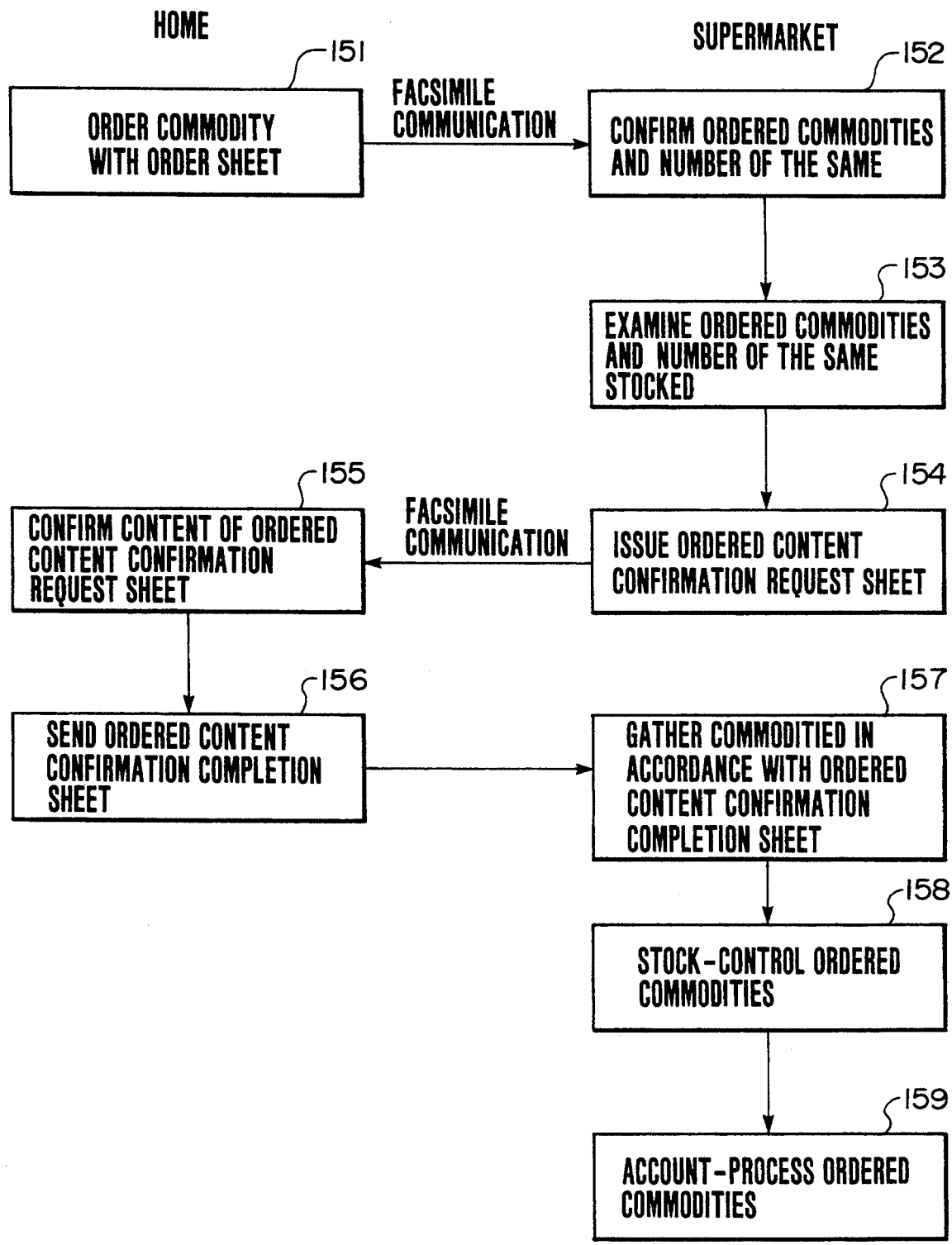
FIG. 13 is a flow chart which illustrates the basic operation of the automatic order receiving and sale management system according to the present invention.

Then, the basic operation of this embodiment thus-constituted will now be described with reference to an operational flow chart shown in FIG. 13. First, each home uses the home delivery order sheet 501 or the delivery request order sheet 502 to order a commodity through the facsimile machine (step 151). The supermarket, which has received the order thus-made, confirms the commodity ordered and the number of it shown on the order sheet (step 152). Then, the status of the stock of the ordered commodity and the number of the same are examined (step 153) before the ordered content confirmation request sheet 506 including the result of the examination is issued and sent it to the home with the facsimile machine (step 154). The home, which has received it, confirms the contents (step 155) before it sends the ordered content confirmation completion sheet 507 to the supermarket with the facsimile machine (step 156). The supermarket, which has received it, gathers the ordered commodity in accordance through the contents of the ordered content confirmation completion sheet 507 (step 47). Then, the supermarket performs the stock control operation, such as a novel supplementation (step 158). Then, the account operation such as the processing of a bill and a sales slip and the automatic payment operation and the like are performed (step 159).

Then, a further specific operation of the above-described embodiment will now be described. For example, a consideration is made about a case in which a plurality of housewives of ordinary homes hold a cooking institute at a home. Furthermore, a case is considered in which the foods for the dinner are purchased from the supermarket shown in FIG. 1 to which the housewife has been registered as a customer. The purchase of the foods is performed by utilizing the facsimile machine device disposed at the home at which the institute is held and the commodity order label 300 is applied to the order sheet 100 brought from her home while entering the number of the commodities before it is transmitted to the supermarket.

The commodities are delivered to the home and the payment is made in cash at the requested delivery time four o'clock p.m.

In order to prevent the unlawful use, the above-described mode (5) "Checking of the No. of the sender is required and as well as checking of the registration card is not required. However, in a case where an abnormal fact has been detected in checking the No. of the sender, the registration card must be checked".

In this case, the commodity order label 503 of the subject commodity shown in FIG. 4 is applied to the home delivery order sheet 501 shown in FIG. 2 and received from the supermarket at the time of the customer registration process. Then, the necessary items are entered in the above-described sheet so as to be transmitted to the supermarket.

The commodity order label 503 is cut directly or after copying from the brochure or the leaflet so as to be applied to the commodity order label application field 11 of the home delivery order sheet 100.

If the same commodity of the subject commodity has been purchased from the supermarket, the commodity order label corresponding to the commodity can be used if it has been given at the time of the previous purchase process. If the same dish is prepared at the previous order, the home delivery order sheet 100, which has been used at the previous order, can be used.

The commodity order label 503 is arranged in such a manner that the marking bar code 19 and the ordered commodity number field 20 can be filled up with the number of the ordered commodities. The marking bar code 19 is entered in such a manner that the figures of the number of the ordered commodities respectively corresponding to a ten digit and a one digit are smeared with a black pencil. The ordered commodity number field 20 is filled with Arabic figures.

The marking bar codes 9 and 12 of the home delivery order sheet 100 must be marked. The marking bar code 9 is marked so as to require the delivery at four o'clock p.m in such a manner that a figure in a square disposed between two bar codes is smeared with a block pencil. Since the individual required delivery date and hour instruction sheet is present in this case, the requirement of four o'clock is marked by the marking bar code method so as to be transmitted together with the order sheet 100 by the facsimile device 1. The marking bar code 12 is marked in such a manner that, the right marking bar code of each of the intermediate order sheets 100 is smeared and the left marking bar code of the final order sheet 100 is smeared because a plurality of the order sheets 100 must be used in a case where the number of the commodity order labels 300 is large before the order sheets 501 are transmitted. The marking bar code 13 is not marked in this case because the payment is made in cash.

The supermarket receives it by the facsimile and automatic recognizing/editing device 2. Referring to FIG. 11, compressed data transmitted to the net control portion 126 through a public telephone line is demodulated into a digital signal by the modem of the demodulating portion 127. Then, it is decoded into image digital data by the decoding portion 129. The facsimile No. of the sender is detected by the sender No. detection portion 128 so as to be transmitted to the recognition result total checking portion 139. Then, the order sheet bar code 8 of the home delivery order sheet 100 is recognized by the sheet bar code cutting and recognizing portion 130 so that a fact that the subject sheet is the home delivery order sheet 100 is understood.

The sheet format checking portion 131 transmits data denoting the cut position to the recognition subject cutting portion 133 in accordance with the result of the recognition made by the sheet bar code cutting and recognizing portion 130.

Also the black and white change detection portion 132 transmits data denoting the position of the cut bar code or the marking bar code to the recognition subject cut portion 133.

The recognition subject cut portion 133 checks data transmitted from the sheet format checking portion 131 and the black and white change detection portion 132 so as to cut only the portion to be recognized.

The each-recognition pre-processing portion 134 subjects the cut portion to a normalization of the size of the character or the like and correction of the gradient so that data about the subject to be recognized is transmitted to the bar code recognizing portion 135, the mark sheet recognizing portion 136, the printed-figure recognizing portion 137 and the hand-written figure recognizing portion 138 depending upon the subject to be recognized.

The result of each recognition is totally discriminated by the recognition result total checking portion 139 before it is, with information about recognition disable information due to an error and omission, transmitted to the store controller 103.

Image data and the result of the recognition thus-received are, as a confirmation evidence, stored in the file control storage device 107.

The bar code recognizing portion 135 recognizes the customer bar code 10 on the home delivery order sheet 100 so as to transmit the result of the recognition to the recognition result total checking portion 139. If such a fact has been detected from customer information that the sender facsimile No. is different from the registered No., a fact that the registration card must be checked at the time of recognizing the order content confirmation request sheet 506 to be sent is understood.

The store controller 103 performs processes such as a stock checking operation in accordance with recognition result information thus-transmitted before it transmits information to the facsimile and automatic editing device 141.

The facsimile and automatic editing device 141 processes the ordered content confirmation request sheet 506 shown in FIG. 9 in accordance with data transmitted from the recognition result total checking portion 139 and the store controller 103 so as to transmit it to the facsimile device 1 of the oderer home.

The orderer home receives and confirms the contents of the ordered content confirmation request sheet 400. If the ordered contents are correct, the subject field in the confirmation checking field 124 of the ordered content confirmation completion sheet 507 shown in FIG. 10 is marked before the registration card 508 shown in FIG. 12 or its copy is applied to the registration card application field so as to be facsimile-transmitted to the supermarket.

When the supermarket receives the ordered-content confirmation completion sheet 507 shown in FIG. 10 and as well as the marking bar code of the "confirmation of a fact that ordered content is correct is made" field is marked, the code No. of the registration card is checked at this order from the customer.

The code No. is checked in such a manner that the code No. bar code 143 in the registration card 508 and interposed between the bar codes is cut by the recognition subject cut portion 133 via the sheet format checking portion 131 and the black and white change detection portion 132 so as to be recognized by the bar code recognizing portion 135. It is collated with the code No. registered in the file of the file control storage device 107 in the registered card checking portion 140. Only in the case where the two code Nos. coincide with each other, the subject order can be completed. If they do not coincide with each other or the code No. bar code 143 cannot be cut, a message of this fact is transmitted to the sender while cancelling this commodity order.

After the commodity order is completed, the store controller 103 automatically performs the stock management to the account management operations before the ordered commodity is automatically packed in order to transmit it to the orderer.

In a case where the commodity is a gift or the like, the address, name and the telephone number of the receiver are entered in the receiver field 15 of the delivery request order sheet 200 shown in FIG. 3. Furthermore, the required delivery date is marked in the marking bar code 16 and entered in the figure entry field 17 before the sheet 200 is transmitted to the supermarket by the facsimile device. The order sheet is different from the above-described home delivery order sheet in this case. The method of checking the unlawful operation is the same.

The following effects can be obtained from the second embodiment:

(1) If a facsimile machine is possessed, the orderer is able to order commodities by a simple process and an entry method from the home while confirming the commodity and the delivery date. If the delivery service is provided according to this embodiment, a system can be realized, with which a labor of go-shopping and looking for the commodity can be saved.

(2) If an exclusive facsimile machine is not possessed by the orderer, the orderer can be registered as a customer.

(3) The orderer is able to request a checking of the sender facsimile machine No. or the code No. using the registration card for the purpose of preventing the unlawful order.

(4) The sales shop such as a supermarket is able to constitute an unmanned order receipt system by using the automatic recognizing device according to the present invention except for exceptional operations, the system being capable of automatically checking the unlawful order to meet the desired convenience of the customer.

(5) Since the bar codes and the marking bar codes are used in the order sheet and the like, the items to be recognized can be cut by a single simple process in which the black and white bar codes are detected. Therefore, the above-described process can be completed correctly at a high speed.

Third Embodiment

The black and white change pattern of the bar code employed in the first embodiment, the compression efficiency is unsatisfactory in the MH coding or the coding method for the G3 coding method which is standardized in the facsimile transmission field. In particular, in a case where the width of each bar is 0.25 mm or less, the data quantity will be increased due to the encoding process, causing a problem to arise in that too long a time is taken to complete the data transmission.

Accordingly, an object of the present invention is to provide a facsimile receiving sheet automatic recognizing apparatus capable of overcoming the above-described problem, reducing the data quantity processed in an automatic order/sales management system utilizing facsimile machine and shortening a required time to complete the communication.

In order to achieve the above-described object, the apparatus according to this embodiment comprises means for automatically receiving a sheet transmitted from an orderer and having black and white bar codes each of which is formed into a thick line having a short longitudinal length, means for detecting the positions of the bar code, a mark sheet and a figure in the sheet received and for automatically cutting their images, means for automatically recognizing the cut bar code, the mark sheet and the figure and transmitting the result of the recognition to a store controller of an automatic order receiving and sales management system, means for storing encoded data on the receipt sheet in parallel to the recognition process and means for reading data from a file to display and/or print it in response to a command.

Therefore, according to this embodiment, the unsatisfactory compression efficiency of the bar code portion in the MH encoding or the MR encoding operation can be improved by enlarging the thickness of each bar and the reducing the longitudinal size. Therefore, the quantity of data to be encoded and transmitted can be reduced, causing a time taken to complete the communication of data to be shortened.

FIG. 14 illustrates an example of a home delivery order sheet 509 for use when a home delivery is required. Reference numeral 208 represents a bar code denoting a fact that the subject sheet is the home delivery order sheet 509. In a case where the ordered commodity is received at the supermarket, a packing requirement order sheet (omitted from illustration) is used which is arranged into the same format as the above-described sheet except for the bar code 208 shown in FIG. 14. Reference numeral 209 represents a bar code denoting the customer No. for use when the orderer has been registered. Reference numeral 210 represents a bar code arranged in such a manner that marking is performed by smearing a figure held between two bar codes with a black pencil in only a case where the payment is made by the automatic payment method as an alternative to the cash payment (hereinafter marking of the type described above is called a marking bar code). Reference numeral 211 represents a field to which a commodity order label 510 is applied. Reference numeral 212 represents a marking bar code with which the subject sheet is the final sheet at this ordering action or a further sheet remains is denoted by smearing the figure with a black pencil.

Each of bar codes 208, 209, 210 and 212 in the home delivery order sheet 509 is printed with thick lines and has the longitudinal size which is shorter than that of an ordinary bar code.

Figure 15:
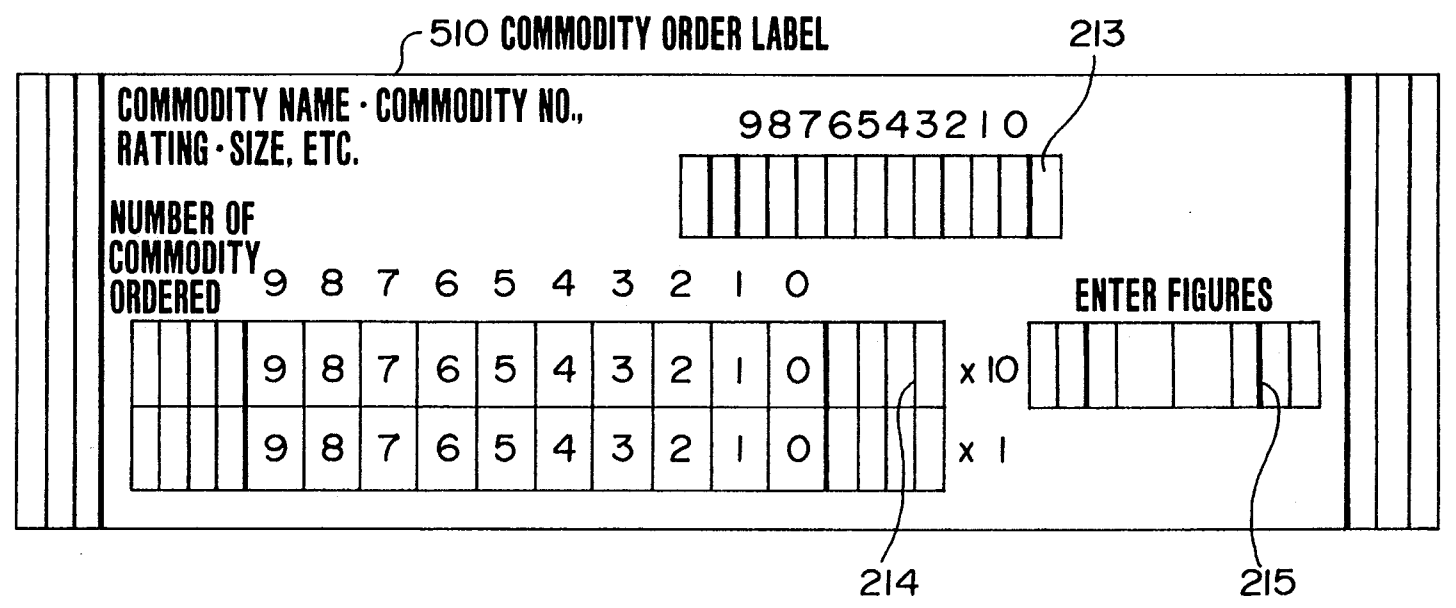

FIG. 15 illustrates an example of a commodity order label 510 which is used in such a manner that it is separated from the brochure or the like so as to be applied to the commodity order label application field 21 shown in FIG. 14. Reference numeral 213 represents a commodity order bar code, 214 represents a marking bar code for instructing the number of the ordered commodities and 215 represents a field in which the number of the ordered commodities is entered. According to this example, 99 commodities can be ordered.

Also each of bar codes 213, 214 and 215 in FIG. 15 is printed with thick lines and has the longitudinal size which is shorter than that of an ordinary bar code similarly to the bar codes 208, 210 and 212 shown in FIG. 14.

Figure 16:
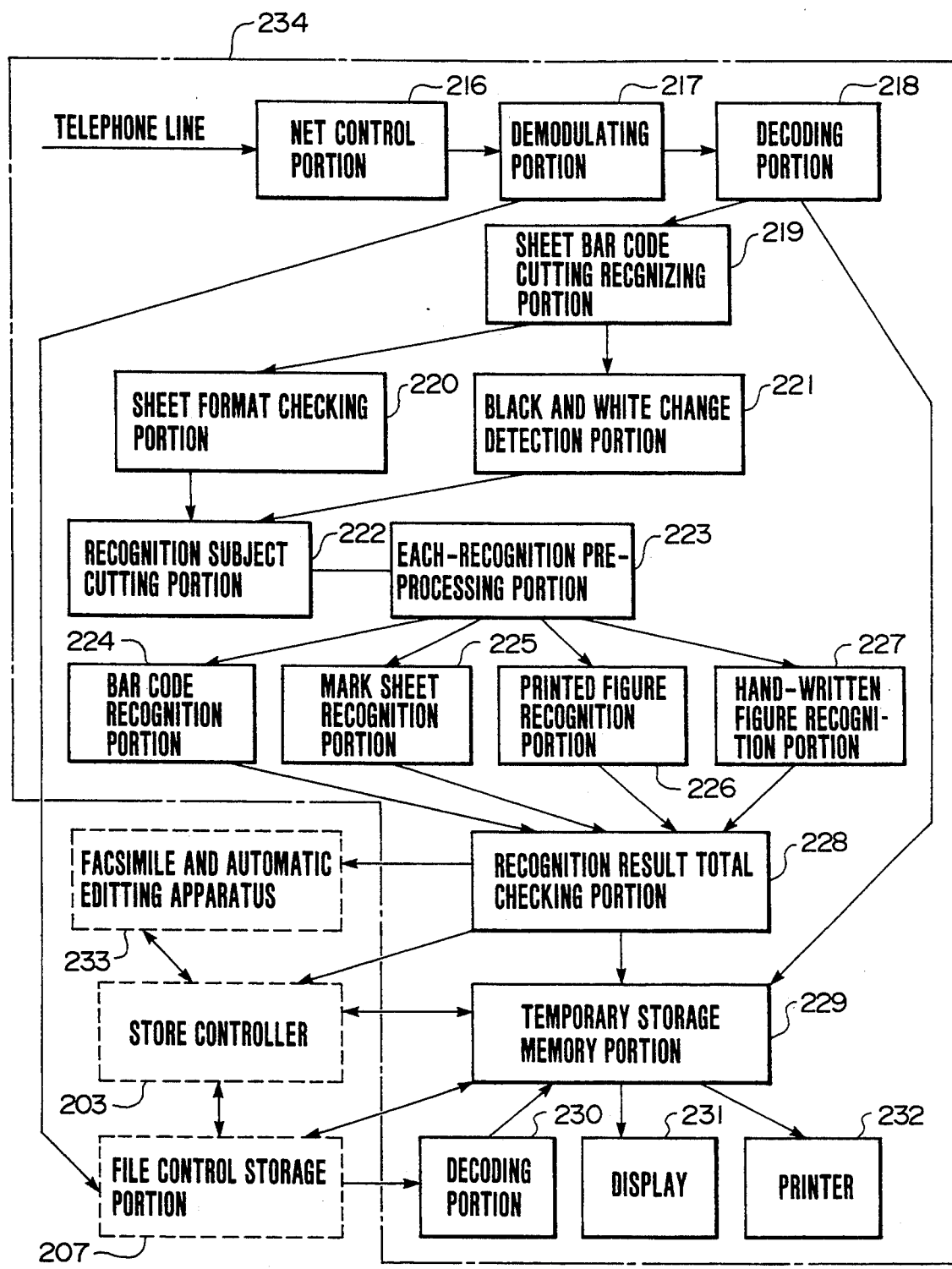
FIG. 16 is a block diagram which illustrates the automatic facsimile-receiving-sheet recognizing apparatus.

FIG. 16 is a block diagram which illustrates an automatic facsimile sheet recognizing device 234 of the facsimile and automatic recognizing/editing unit 2 shown in FIG. 1. Referring to FIG. 7, reference numerals 216 to 232 represent elements having functions of the above-described device 234. A structure including a facsimile and automatic editing device 233 is equivalent to the facsimile and automatic recognizing/editing unit 2 shown in FIG. 1.

Referring to FIG. 16, reference numeral 216 represents a net control portion, 217 represents a demodulating portion, 218 represents a decoding portion, 219 represents a sheet bar code cutting and recognizing portion, 220 represents a sheet format checking portion, 221 represents a black and white change detection portion, 222 represents a recognized subject cutting portion, 223 represents an each-recognition preprocessing portion, 224 represents a bar code recognizing portion, 225 represents a mark sheet recognizing portion, 226 represents a printed figure recognizing portion, 227 represents a hand-write figure recognizing portion, 228 represents a recognized result total checking portion, 229 represents a temporary storage memory portion, 230 represents a decoding portion, 231 represents a display and 232 represents a printer.

Then, the operation of the above-described embodiment will now be described. For example, it is estimated that a customer of an ordinary family purchases foodstuffs for a dinner and daily necessaries from a supermarket which is shown in FIG. 1 and to which the customer is registered, and that the ordered commodities are delivered to the home and the payment is made in cash.

In this case, the commodity order label 510 of the subject commodity shown in FIG. 15 is applied to the home delivery order sheet 509 shown in FIG. 2 and receipt from the supermarket at the time of the customer registration process. Then, the necessary items are filled in the above-described sheet so as to be transmitted to the supermarket.

The commodity order label 510 is cut directly or after copying from the brochure or the leaflet so as to be applied to the commodity order label application field 211 of the home delivery order sheet 509.

If the same commodity of the subject commodity has been purchased from the supermarket, the commodity order label corresponding to the commodity can be used if it has been given at the time of the previous purchase process. If the same dish is prepared at the previous order, the home delivery order sheet 509, which has been used at the previous order, can be used.

The commodity order label 510 is arranged in such a manner that the marking bar code 214 and the ordered commodity number field 215 can be filled up with the number of the ordered commodities. The marking bar code 214 is entered in such a manner that the figures of the number of the ordered commodities respectively corresponding to the digit and a one digit are smeared with a black pencil. The ordered commodity number field 15 is filled with Arabic figures.

The marking bar codes 212 of the home delivery order sheet 509 must be marked. The marking bar code 212 is marked in such a manner that, the right marking bar code of each of the intermediate order sheets 509 is smeared and the left marking bar code of the final order sheet 509 is smeared because a plurality of the order sheets 509 must be used in a case where the number of the commodity order labels 510 is large before the order sheets 509 are transmitted. The marking bar code 210 is not marked in this case because the payment is made in cash.

The supermarket receives it by the facsimile and automatic recognizing/editing device 2. Referring to FIG. 16, compressed data transmitted to the net control portion 216 through a public telephone line is demodulated into a digital signal by a modem of the demodulating portion 217. Then, it is, in the form of the compressed data, stored in the file control and storage device 207. Also the compressed data is decoded into a digital signal by the decoding portion 218.

Then, the processes ensuring the process performed in the sheet bar code cutting and recognizing portion 219 are commenced. Simultaneously, the encoded data is stored in the temporary storage memory portion 229.

The sheet bar code cutting and recognizing portion 219 first recognizes the bar code 208 of the order sheet 509 so that a fact that the subject sheet 509 is the home delivery order sheet 509 is recognized. Then, each bar code is recognized with an excellent compression efficiency in comparison to the MH or the MR encoding method of the G3 encoding method because the bar code is formed by thick lines and the longitudinal size is shortened. Therefore, the data quantity can be reduced so that the time required to complete the data transmission can be shortened.

The sheet format checking portion 220 transmits data denoting the cut position to the recognition subject cutting portion 222 in accordance with the result of the recognition made by the sheet bar code cutting and recognizing portion 219.

Also the black and white change detection portion 221 transmits data denoting the position of the cut bar code or the marking bar code to the recognition subject cut portion 222.

The recognition subject cut portion 222 checks data transmitted from the sheet format checking portion 220 and the black and white change detection portion 221 so as to cut only the portion to be recognized.

The each-recognition pre-processing portion 223 subjects the cut portion to a normalization of the size of the character or the like and correction of the gradient so that data about the subject to be recognized is transmitted to the bar code recognizing portion 224, the mark sheet recognizing portion 225, the printed-figure recognizing portion 226 and the hand-written figure recognizing portion 227 depending upon the subject to be recognized.

The result of each recognition is totally discriminated by the recognition result total checking portion 228 before it is, with information about recognition disable information due to an error and omission, transmitted to the store controller 203.

Image data and the result of the recognition thus-received are, as a confirmation evidence, stored in the file control storage device 207. In a case where a confirmation of received data stored in the file control and storage device 207 is required, it is decoded into image data by the decoding portion 230 before it is stored in the temporary storage memory portion 229 so as to be displayed on the display 231 or printed by the printer 232 whenever the requirement is made.

The store controller 203 performs processes such as a stock checking operation in accordance with recognition result information thus-transmitted before it transmits information to the facsimile and automatic editing device 233.

The facsimile and automatic editing device 233 processes the ordered content confirmation request sheet in accordance with data transmitted from the recognition result total checking portion 228 and the store controller 203 so as to transmit it to the facsimile device of the orderer home.

The orderer home receives and confirms the contents of the ordered content confirmation request sheet. If the ordered contents are correct, the ordered content confirmation completion sheet is facsimile-transmitted to the super market.

When the supermarket receives the ordered content confirmation completion sheet, the order operation is completed if the contents of the ordered contents are correct.

FIG. 17 is an example of a commodity order label 511 according to an embodiment of the present invention. According to this embodiment, the commodity order bar code 251, the ordered commodity number instructing marking bar code 252 and a bar code denoting the ordered number entry field 253 are printed with thick lines formed in the lateral direction. Furthermore, the longitudinal size of the bar code is shortened in comparison to the bar code printed in the longitudinal direction. Therefore, the data quantity can be reduced and the time required to transmit data can be shortened similarly to a case in which the commodity order label 510 shown in FIG. 15 is used.

The following effects can be obtained according to this embodiment:

(1) The unsatisfactory compression efficiency of the bar code portion in the MH encoding or the MR encoding operation can be improved by enlarging the thickness of each bar and the reducing the longitudinal size. Therefore, the quantity of data to be encoded and transmitted can be reduced, causing a time taken to complete the communication of data to be shortened.

(2) Since the process of filing the received data for use as an evidence, confirmation and recording operations arranged in such a manner that encoded and compressed data are, simultaneously with the decoding process performed for the recognition, stored, as they are, in the file device after it has been transmitted as an alternative to the decoded image data, the quantity of data about the received sheet to be stored in the file device can be reduced. Furthermore, since the parallel process methods are employed, the time taken to store data can be neglected.

(3) If received data stored in the file device is required to be confirmed, it can be displayed on the display or printed by the printer. Therefore, the necessity of printing out it can be eliminated at the time of a normal automatic recognition process. Therefore, the sheet can be saved satisfactorily.

Fourth Embodiment

According to the first embodiment, many and unspecified persons set the order sheet or the like to the facsimile machine. Therefore, the original document papers are possibly inserted while being inclined with respect to the facsimile machine. According to the current technological level, the bar code can be recognized while eliminating the necessity of performing a gradient correction process if at least one line of the bar code exists from an end to another end even though the original document paper is inclined. However, an original document sheet whose end portion is lost must be subjected to the gradient correction process.

On the other hand, characters cannot be recognized if the original document sheet is inclined, causing the gradient correction process to be performed to maintain a satisfactory recognition accuracy. However, a problem arises in that a desired correction effect cannot be obtained if the gradient angle cannot be correctly obtained.

An object of the present invention is to provide a facsimile receipt sheet automatic recognition apparatus capable of overcoming the above-described problems experienced with the conventional structure and correctly and easily obtaining the gradient angle of the facsimile receipt sheet.

In order to achieve the above-described object, an apparatus according to this embodiment comprises means for detecting an angle of the order sheet or the like in accordance with a plurality of black and white bars which have different thicknesses and which are printed on an order the two longitudinal end portions thereof, at the time of facsimile-receiving the sheet and automatically recognizing the cut subject to be recognized after correcting it by the detected gradient angle.

Therefore, according to the present invention, a fact that the transmission sheet is not inclined at the time of facsimile-transmitting the order sheet or the like can be detected because the white bars and the black bars respectively formed in the two longitudinal end portions of the receipt sheet can be clearly separated from each other if the transmission sheet is not inclined. If the transmission sheet is inclined, the white bars and the black bars respectively formed in the two longitudinal end portions of the receipt sheet are alternately changed. Therefore, the fact that the transmission is inclined can be detected. Furthermore, the gradient angle can be obtained in accordance with the length of each of the white bars and the black bars.

The fact that the transmission sheet is inclined to right or left can be discriminated in such a manner that, if, for example, the uppermost thick bar portion is present in the leading portion of the line at the time of the scanning operation performed from the left side, a discrimination is made that the sheet is inclined to left. If the same is present at the end portion of the line, a discrimination is made that the sheet is inclined to right.

In a case where the top end portion is omitted due to an overflow or the like, a discrimination can be made in accordance with the black and white bar disposed in the lowermost portion.

Furthermore, the upper and lower portions of the sheet can be discriminated by making the number of the black and white bars and the thickness of the same to be different from one another.

Figure 18:
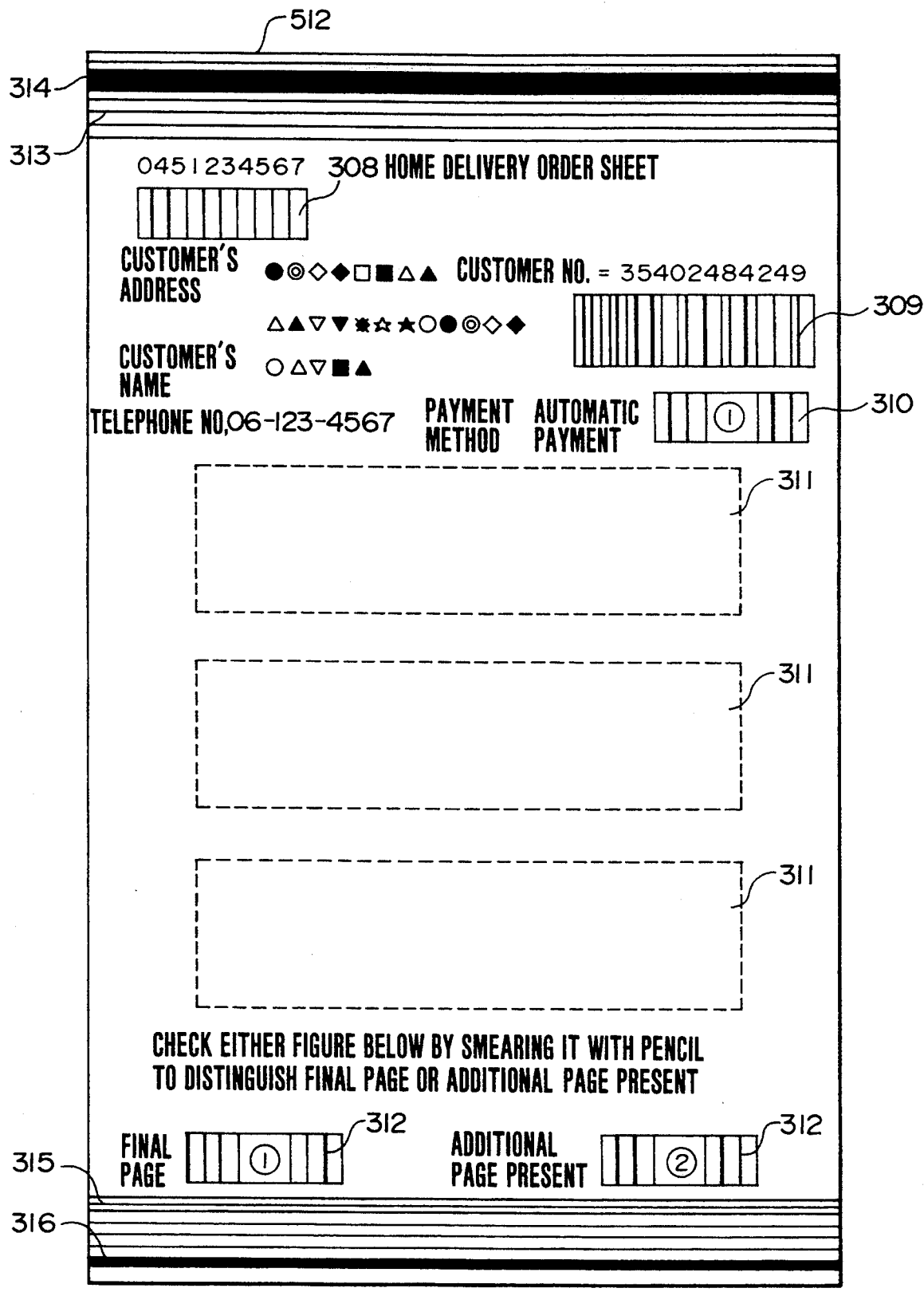
FIG. 18 illustrates an example of the home delivery order sheet.

FIG. 18 illustrates an example of a home delivery order sheet 512 for use when a home delivery is required. Reference numeral 308 represents a bar code denoting a fact that the subject sheet is the home delivery order sheet 512. In a case where the ordered commodity is received at the supermarket, a packing requirement order sheet (omitted from illustration) is used which is arranged into the same format as the above-described sheet except for the bar code 308 shown in FIG. 18. Reference numeral 309 represents a bar code denoting a customer No. in a case where the orderer has been registered. Reference numeral 310 represents a bar code arranged in such a manner that marking is performed by smearing a figure held between two bar codes with a black pencil in only a case where the automatic payment method is employed as an alternative to the cash payment (hereinafter marking of the type described above is called as a marking bar code). Reference numeral 11 represents a field to which a commodity order label 513 shown in FIG. 19 is applied. Reference numeral 312 represents a marking bar code with which the subject sheet is the final sheet at this ordering action or a further sheet remains is denoted by smearing the figure with a black pencil.

Reference numeral 313 represents a black thin bar printed laterally in the upper end portion of the home delivery order sheet 512. Reference numeral 314 represents a black thick bar printed in parallel and above the thin bar 313. Reference numeral 315 represents a black thin bar printed laterally in the lower portion of the sheet 512. Reference numeral 316 represents a black thick bar printed in parallel and below the thin bar 315. The number of the thin bars 313 and that of 315 are different and the thick bars 314 and 316 have the different thickness.

FIG. 19 illustrates an example of a commodity order label 513 which is used in such a manner that it is taken from the brochure or the like so as to be applied to the commodity order label application field 311 shown in FIG. 18. Reference numeral 317 represents a commodity order bar code, 318 represents a marking bar code for instructing the number of the ordered commodities and 319 represents a field in which the number of the ordered commodities is entered. According to this example, 99 commodities can be ordered.

Figure 20:
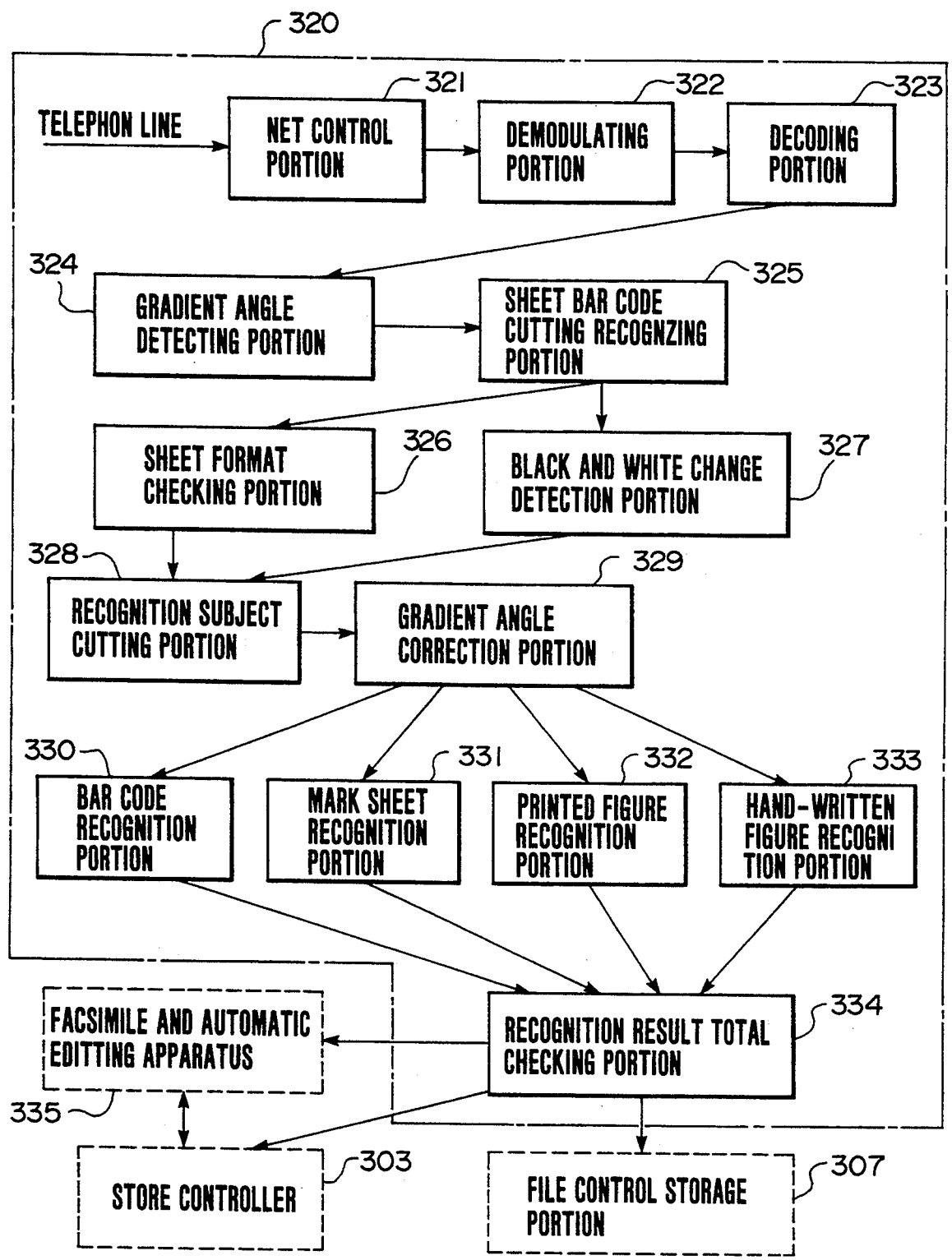
FIG. 20 is a block diagram which illustrates the automatic facsimile-receiving-sheet recognizing apparatus.

FIG. 20 is a block diagram which illustrates an automatic facsimile sheet recognizing device 320 of the facsimile and automatic recognizing/editing unit 2 shown in FIG. 1. Referring to FIG. 20, reference numerals 321 to 334 represent elements having functions of the above-described device 320. A structure including a facsimile and automatic editing device 335 is equivalent to the facsimile and automatic recognizing/editing unit 2 shown in FIG. 1.

Referring to FIG. 20, reference numeral 321 represents a net control portion, 322 represents a demodulating portion, 323 represents a decoding portion, 324 represents a gradient angle or the like detection portion, 325 represents a sheet bar code cutting and recognizing portion, 326 represents a sheet format checking portion, 327 represents a black and white change detection portion, 328 represents a recognized subject cutting portion, 329 represents a gradient angle correction portion, 330 represents a bar code recognizing portion, 331 represents a mark sheet recognizing portion, 332 represents a printed figure recognizing portion, 333 represents a hand-write figure recognizing portion and 334 represents a recognized result total checking portion.

Then, a specific operation of the above-described embodiment will now be described. For example, it is estimated that a customer of an ordinary family purchases foodstuffs for a dinner and daily necessaries from a supermarket which is shown in FIG. 1 and to which the customer is registered. An assumption is made that the ordered commodities are delivered to the home and the payment is made in cash.

In this case, the commodity order label 513 of the subject commodity shown in FIG. 19 is applied to the home delivery order sheet 512 shown in FIG. 18 and received from the supermarket at the time of the customer registration process. Then, the necessary items are filled in the above-described sheet so as to be transmitted to the supermarket.

The commodity order label 513 is cut directly or after copying from the brochure or the leaflet so as to be applied to the commodity order label application field 311 of the home delivery order sheet 512.

If the same commodity of the subject commodity has been purchased from the supermarket, the commodity order label corresponding to the commodity can be used if it has been given at the time of the previous purchase process. If the same dish is prepared at the previous order, the home delivery order sheet 512, which has been used at the previous order, can be used.

The commodity order label 513 is arranged in such a manner that the marking bar code 318 and the ordered commodity number field 319 must be filled up with the number of the ordered commodities. The marking bar code 318 is entered in such a manner that the figures of the number of the ordered commodities respectively corresponding to a ten digit and a one digit are smeared with a black pencil. The ordered commodity number field 319 is filled with Arabic figures.

The marking bar codes 312 of the home delivery order sheet 512 must be marked. The marking bar code 312 is marked in such a manner that, the right marking bar code of each of the intermediate order sheets 512 is smeared and the left marking bar code of the final order sheet 512 is smeared because a plurality of the order sheets 512 must be used in a case where the number of the commodity order labels 513 is large before the order sheets 512 are transmitted. The marking bar code 310 is not marked in this case because the payment is made in cash.

The supermarket receives it by the facsimile and automatic recognizing/editing unit 2. Referring to FIG.

20, compressed data transmitted to the net control portion 321 through a public telephone line is demodulated into a digital signal by a modem of the demodulating portion 322. Then, it is decoded into image digital data by the decoding portion 323.

Figure 21:
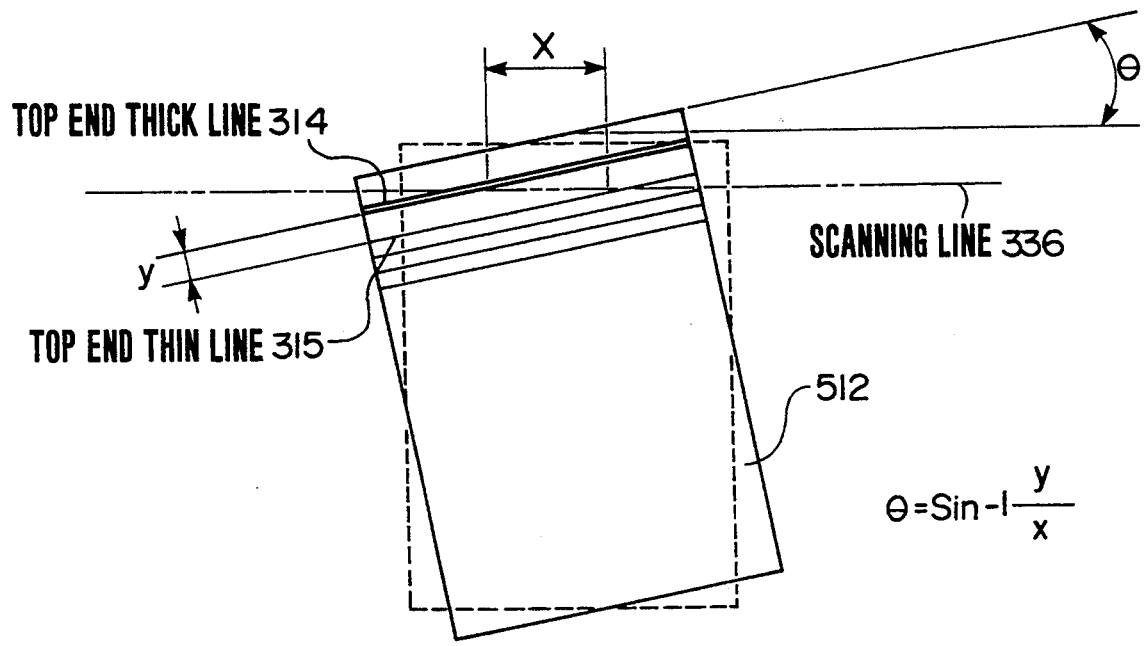
FIGS. 21 and 22 illustrate a method of detecting the gradient angle of the order sheet.
Figure 22:
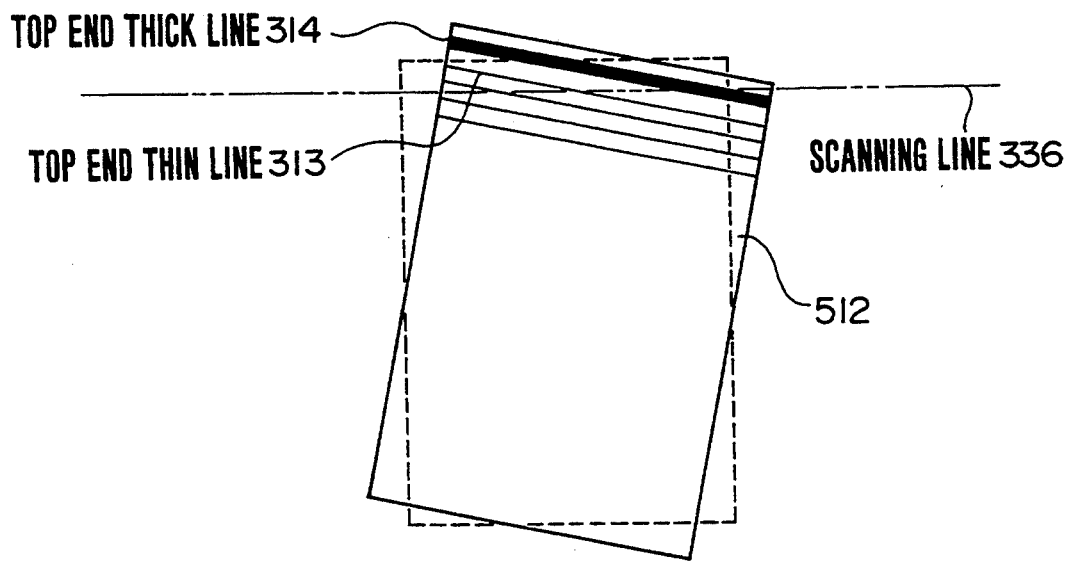

The gradient angle or the like detection portion 324 obtains the gradient angle from the thin bar 313 and the thick bar of the above-described image data. For example, if the order sheet 512 has been transmitted while being inclined to the left as shown in FIG. 21, the thick bar 314 is necessarily first detected on a scanning line 336. In a case where the order sheet 512 has been transmitted while being inclined to the right as shown in FIG. 22, the thin bar 313 is necessarily first detected on the scanning line 336. Therefore, a fact that the order sheet 512 is inclined to the right or left can be discriminated. Furthermore, gradient angle o of the order sheet 512 can be obtained by detecting lateral distance x on the scanning line 336 between the thick bar 314 and the thin bar 313 because vertical distance y between the thin bar 313 and the thick bar 314 has been determined at the time of the printing the bars.

The number of the thin bars 313 disposed in the upper portion of the order sheet 512 and that of the thin bars 315 disposed in the lower end portion of the same are made to be different from each other. Furthermore, the thickness of the thick bar 314 disposed in the top end portion and the thick bar 316 disposed in the lower end portion are different from each other. Therefore, the fact that the upper and the lower end portions of the order sheet 512 are inverted, that is, the order sheet 512 has been inserted while being inverted, by detecting the number of the bars by detecting the proportion of the black area. Thus, the gradient angle of the order sheet 512 and the vertical attitude of the same are discriminated by the gradient angle or the like detection portion 324.

Then, the order sheet bar code 308 of the home delivery order sheet 512 is recognized by the sheet bar code cutting and recognizing portion 325 so that a fact that the subject sheet is the home delivery order sheet 512 is understood.

The sheet format checking portion 326 transmits data denoting the cut position to the recognition subject cutting portion 328 in accordance with the result of the recognition made by the sheet bar code cutting and recognizing portion 325.

Also the black and white change detection portion 327 transmits data denoting the position of the cut bar code or the marking bar code to the recognition subject cut portion 328.

The recognition subject cut portion 328 checks data transmitted from the sheet format checking portion 326 and the black and white change detection portion 327 so as to cut only the portion to be recognized.

The gradient angle correction portion 329 subjects the cut portion to the gradient correction if necessary so that data about the subject to be recognized is transmitted to the bar code recognizing portion 330, the mark sheet recognizing portion 331, the printed-figure recognizing portion 332 and the handwritten figure recognizing portion 333 depending upon the subject to be recognized.

The result of each recognition is totally discriminated by the recognition result total checking portion 334 before it is, with information about recognition disable information due to an error and omission, transmitted to the store controller 303.

Image data and the result of the recognition thus-received are, as a confirmation evidence, stored in the file control storage device 307.

The store controller 303 performs processes such as a stock checking operation in accordance with recognition result information thus-transmitted before it transmits information to the facsimile and automatic editing device 335.

The facsimile and automatic editing device 335 processes the ordered content confirmation request sheet 400 in accordance with data transmitted from the recognition result total checking portion 334 and the store controller 303 so as to facsimile-transmit it to the orderer home.

The orderer home receives and confirms the contents of it. If the ordered contents are correct, the orderer home facsimile-transmit the ordered content confirmation completion sheet to the supermarket.

When the supermarket receives the ordered content confirmation completion sheet, it checks the ordered contents. If it has been confirmed that the ordered contents are correct, the commodity order process is ended here.

Since this embodiment includes means for detecting an angle of the order sheet or the like in accordance with a plurality of black and white bars each having different thicknesses and printed laterally on an order sheet or the like at the two longitudinal end portions thereof, at the time of facsimile-receiving the sheet and automatically recognizing the cut subject to be recognized after correcting it by the detected gradient angle. Therefore, the ordered contents can be correctly grasped.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An automatic facsimile-receiving-sheet recognizing apparatus comprising:
 a facsimile means, provided at an orderer side, for transmitting information on an order sheet on which commodity order labels incorporating a bar code and a mark sheet, for commodities to be ordered, are stuck, to a seller side, said order sheet incorporating figures and an address written thereon;
 said apparatus further comprising, at said seller side:
 information receiving means for receiving said information from said facsimile means;
 detecting means, receiving said information from said information receiving means, for detecting positions of said bar code, said mark sheet, said figures and said address from said information received by said information receiving means, and for extracting image data corresponding to said bar code, said mark sheet, said figure and said address in accordance with said detected positions;
 a store controller for checking stock inventory;
 recognizing means, receiving said image data from said detecting means, for recognizing said image data to produce recognized data;
 error detecting means, receiving said recognized data from said recognizing means, for detecting an error or omission in writing, or a part which cannot be recognized, on said order sheet to produce detected data, and for transmitting said recognized data and said detected data to said store controller; and filing means, receiving said information from said information receiving means, for filing said information for evidence as digital image data.

2. An automatic facsimile-receiving-sheet recognizing apparatus as set forth in claim 1, wherein said store controller receives said data corresponding to said address as digital image data in order to prepare a distribution instruction sheet.

* * * * *